(12) United States Patent
Tak et al.

(10) Patent No.: US 11,131,874 B2
(45) Date of Patent: Sep. 28, 2021

(54) OPTICAL FILM AND DISPLAY DEVICE INCLUDING THE SAME

(71) Applicant: Samsung Display Co., Ltd., Yongin-Si (KR)

(72) Inventors: Kyungseon Tak, Hwaseong-si (KR); Young Gu Kim, Yongin-si (KR); Jiyun Park, Hwaseong-si (KR); Jongho Son, Seoul (KR); Jongmin Ok, Hwaseong-si (KR); Sun-Young Chang, Seoul (KR); Hyelim Jang, Hwaseong-si (KR); Baekkyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/815,240

(22) Filed: Mar. 11, 2020

(65) Prior Publication Data
US 2020/0379292 A1   Dec. 3, 2020

(30) Foreign Application Priority Data
May 31, 2019 (KR) .................. 10-2019-0064621

(51) Int. Cl.
*G02F 1/1335* (2006.01)
*G02B 5/02* (2006.01)

(52) U.S. Cl.
CPC ..... *G02F 1/133504* (2013.01); *G02B 5/0215* (2013.01); *G02B 5/0278* (2013.01)

(58) Field of Classification Search
None
See application file for complete search history.

(56) References Cited

U.S. PATENT DOCUMENTS

| 8,199,275 | B2 | 6/2012 | Mizusako |
| 9,507,060 | B2 | 11/2016 | Shim et al. |
| 9,678,379 | B2 | 6/2017 | Hong et al. |
| 10,268,063 | B2 | 4/2019 | Ju et al. |
| 2016/0187699 | A1* | 6/2016 | Ju ............ G02F 1/133528 349/65 |

FOREIGN PATENT DOCUMENTS

| KR | 1020200138558 A | 12/2010 |
| KR | 101045261 B1 | 6/2011 |
| KR | 101640718 B1 | 7/2016 |
| KR | 101678649 B1 | 11/2016 |
| KR | 101802628 B1 | 11/2017 |
| KR | 101871552 B1 | 6/2018 |

* cited by examiner

*Primary Examiner* — Richard H Kim
(74) *Attorney, Agent, or Firm* — Cantor Colburn LLP

(57) ABSTRACT

An optical film includes a first pattern layer including a first base portion and first protruding portions disposed on the first base portion to be spaced apart from each other and having a first refractive index and a second pattern layer disposed on the first pattern layer and having a second refractive index. Each of the first protruding portions includes a first sub-protruding portion having a first width in a cross-section perpendicular to the first base portion, a second sub-protruding portion disposed between the first base portion and the first sub-protruding portion and having a width that increases from the first sub-protruding portion to the first base portion, and a third sub-protruding portion disposed on the first sub-protruding portion and having a width that decreases as a distance from the first sub-protruding portion increases.

24 Claims, 20 Drawing Sheets

OPTICAL FILM AND DISPLAY DEVICE INCLUDING THE SAME

This application claims priority to Korean Patent Application No. 10-2019-0064621, filed on May 31, 2019, and all the benefits accruing therefrom under 35 U.S.C. § 119, the content of which in its entirety is herein incorporated by reference.

BACKGROUND

1. Field

Exemplary embodiments of the invention relate to an optical film and a display device including the same. More particularly, exemplary embodiments of the invention relate to an optical film including two patterns having different refractive indices and a display device including the optical film.

2. Description of the Related Art

Various display devices are being used to provide image information, and a liquid crystal display device is widely used for a large-sized display device and a portable display device due to various advantages such as low power consumption.

The liquid crystal display device provides a light emitted from a backlight unit to a liquid crystal display panel to display an image. In addition, the liquid crystal display device includes optical films with various functions added to an outside of the liquid crystal display panel to improve display quality that is often degraded due to a viewing angle.

SUMMARY

Exemplary embodiments of the invention provide an optical film capable of improving side viewing angle characteristics of a display device.

Exemplary embodiments of the invention provide a display device having improved side viewing angle characteristics by optimizing a shape of a pattern layer in the optical film.

An exemplary embodiment of the invention provides an optical film including a first pattern layer including a first base portion and a plurality of first protruding portions disposed on the first base portion, spaced apart from each other and having a first refractive index and a second pattern layer disposed on the first pattern layer and having a second refractive index different from the first refractive index. Each of the plurality of first protruding portions includes a first sub-protruding portion having a first width in a cross-section perpendicular to the first base portion, a second sub-protruding portion disposed between the first base portion and the first sub-protruding portion and having a width that increases from the first sub-protruding portion to the first base portion, and a third sub-protruding portion disposed on the first sub-protruding portion and having a width that decreases as a distance from the first sub-protruding portion increases.

In an exemplary embodiment, an absolute value of a difference between the first refractive index and the second refractive index may be in a range from about 0.2 to about 0.25.

In an exemplary embodiment, the first sub-protruding portion may include a first sub-bottom surface adjacent to the second sub-protruding portion, a first sub-upper surface facing the first sub-bottom surface, and a first sub-side surface connecting the first sub-bottom surface and the first sub-upper surface, and the first sub-side surface may have an inclination angle from about 86 degrees to about 90 degrees with respect to the first sub-bottom surface.

In an exemplary embodiment, the first refractive index may be smaller than the second refractive index, and a spacing interval $W_{P1}$ between first protruding portions adjacent to each other among the plurality of protruding portions and the first width $W_1$ of the first sub-protruding portion in the cross-section perpendicular to the first base portion may have a relationship represented by the following Equation 1, $$0.15 \leq W_1/W_{P1} \leq 0.45, \quad \text{Equation 1}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

In an exemplary embodiment, the first refractive index may be smaller than the second refractive index, and a spacing interval $W_{P1}$ between first protruding portions adjacent to each other among the plurality of protruding portions and a height $H_1$ of each of the first protruding portions in the cross-section perpendicular to the first base portion may have a relationship represented by the following Equation 2, $$0.75 \leq H_1/W_{P1} \leq 1.35, \quad \text{Equation 2}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

In an exemplary embodiment, the first sub-protruding portion may have a rectangular shape in the cross-section perpendicular to the first base portion, and each of the second sub-protruding portion and the third sub-protruding portion may have a trapezoid shape in the cross-section perpendicular to the first base portion.

In an exemplary embodiment, a width of an upper surface of the second sub-protruding portion may be equal to the first width of the first sub-protruding portion, and a width of a lower surface of the third sub-protruding portion may be equal to the first width of the first sub-protruding portion.

In an exemplary embodiment, the second sub-protruding portion may include a second sub-bottom surface adjacent to the first base portion, a second sub-upper surface facing the second sub-bottom surface, and a second sub-side surface connecting the second sub-bottom surface and the second sub-upper surface, and the second sub-side surface may have an inclination angle from about 69 degrees to about 83 degrees with respect to the second sub-bottom surface.

In an exemplary embodiment, a maximum width $W_{B2}$ of the second sub-bottom surface and a maximum width $W_{C2}$ of the second sub-upper surface in a cross-section of the second sub-protruding portion perpendicular to the first base portion may satisfy the following Equation 3.

$$0.67 \leq W_{C2}/W_{B2} \leq 0.91 \quad \text{Equation 3}$$

In an exemplary embodiment, a maximum height $H_1$ in a thickness direction of the first protruding portion and a maximum height $H_{S2}$ in a thickness direction of the second sub-protruding portion in the cross-section of the first protruding portion perpendicular to the first base portion may satisfy the following Equation 4.

$$0.06 \leq H_{S2}/H_1 \leq 0.17 \qquad \text{Equation 4}$$

In an exemplary embodiment, the third sub-protruding portion may include a third sub-bottom surface adjacent to the first sub-protruding portion, a third sub-upper surface facing the third sub-bottom surface, and a third sub-side surface connecting the third sub-bottom surface and the third sub-upper surface, and the third sub-side surface may have an inclination angle from about 69 degrees to about 83 degrees with respect to the third sub-bottom surface.

In an exemplary embodiment, a maximum width $W_{B3}$ of the third sub-bottom surface and a maximum width $W_{C3}$ of the third sub-upper surface in a cross-section of the third sub-protruding portion perpendicular to the first base portion may satisfy the following Equation 5.

$$0.67 \leq W_{C3}/W_{B3} \leq 0.90 \qquad \text{Equation 5}$$

In an exemplary embodiment, a maximum height $H_1$ in a thickness direction of the first protruding portion and a maximum height $H_{S3}$ in a thickness direction of the third sub-protruding portion in the cross-section of each of the plurality of the first protruding portions perpendicular to the first base portion may satisfy the following Equation 6.

$$0.06 \leq H_{S3}/H_1 \leq 0.17 \qquad \text{Equation 6}$$

In an exemplary embodiment, the second pattern layer may include a second base portion facing the first base portion and a plurality of second protruding portions disposed under the second base portion.

In an exemplary embodiment, each of the first protruding portions and the second protruding portions may have a stripe shape extending in one direction.

In an exemplary embodiment, the first pattern layer may further include first concave portions defined between the plurality of first protruding portions, the second pattern layer may further includes second concave portions defined between the plurality of second protruding portions, the plurality of first protruding portions may respectively correspond to the second concave portions, and the plurality of second protruding portions may respectively correspond to the first concave portions.

An exemplary embodiment of the invention provides a display device including a liquid crystal display panel and an optical film disposed on the liquid crystal display panel. The optical film includes a first pattern layer including a first base portion and a plurality of first protruding portions disposed on the first base portion, spaced apart from each other and having a first refractive index and a second pattern layer disposed on the first pattern layer and having a second refractive index different from the first refractive index. Each of the plurality of first protruding portions includes a first sub-protruding portion having a first width in a cross-section perpendicular to the first base portion, a second sub-protruding portion disposed between the first base portion and the first sub-protruding portion and having a width that increases from the first sub-protruding portion to the first base portion, and a third sub-protruding portion disposed on the first sub-protruding portion and having a width that decreases as a distance from the first sub-protruding portion increases.

In an exemplary embodiment, an absolute value of a difference between the first refractive index and the second refractive index may be in a range from about 0.2 to about 0.25.

In an exemplary embodiment, the first refractive index is smaller than the second refractive index, and a spacing interval $W_{P1}$ between first protruding portions adjacent to each other among the plurality of first protruding portions and the first width $W_1$ of the first sub-protruding portion in the cross-section perpendicular to the first base portion may have a relationship represented by the following Equation 1, $$0.15 \leq W_1/W_{P1} \leq 0.45, \qquad \text{Equation 1}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

In an exemplary embodiment, the first refractive index may be smaller than the second refractive index, and a spacing interval $W_{P1}$ between first protruding portions adjacent to each other among the plurality of first protruding portions in the cross-section perpendicular to the first base portion and a height $H_1$ of each of the first protruding portions may have a relationship represented by the following Equation 2, $$0.75 \leq H_1/W_{P1} \leq 1.35, \qquad \text{Equation 2}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

In an exemplary embodiment, the second pattern layer may include a second base portion facing the first base portion and a plurality of second protruding portions disposed under the second base portion. Each of the plurality of second protruding portions may include a fourth sub-protruding portion having a second width in a cross-section perpendicular to the second base portion, a fifth sub-protruding portion disposed between the second base portion and the fourth sub-protruding portion and having a width that increases from the fourth sub-protruding portion to the second base portion, and a sixth sub-protruding portion disposed between the first base portion and the fourth sub-protruding portion and having a width that decreases from the fourth sub-protruding portion to the first base portion.

In an exemplary embodiment, the first refractive index may be greater than the second refractive index, and a spacing interval $W_{P2}$ between second protruding portions adjacent to each other among the plurality of second protruding portions in a cross-section perpendicular to the second base portion and the second width $W_{2-1}$ of the fourth sub-protruding portion may have a relationship represented by the following Equation 1-1, $$0.15 \leq W_{2-1}/W_{P2} \leq 0.45, \qquad \text{Equation 1-1}$$

where $W_{P2}$ is obtained by adding the second width $W_{2-1}$ of the fourth sub-protruding portion and a minimum spacing interval $W_{1-1}$ between the fourth sub-protruding portions of the adjacent second protruding portions, and $W_{1-1}$ and $W_{2-1}$ correspond to distances in a direction perpendicular to an extension direction of the second protruding portions.

In an exemplary embodiment, the first refractive index may be greater than the second refractive index, and a spacing interval $W_{P2}$ between second protruding portions adjacent to each other among the plurality of second protruding portions in the cross-section perpendicular to the second base portion and a height $H_{2-1}$ of each of the second protruding portions may have a relationship represented by the following Equation 2-1, $$0.75 \leq H_{2-1}/W_{p2} \leq 1.35, \qquad \text{Equation 2-1}$$

where $W_{P2}$ is obtained by adding the second width $W_{2-1}$ of the fourth sub-protruding portion and a minimum spacing interval $W_{1-1}$ between the second sub-protruding portions of the adjacent second protruding portions, and $W_{1-1}$ and $W_{2-1}$ correspond to distances in a direction perpendicular to an extension direction of the second protruding portions.

In an exemplary embodiment, the first sub-protruding portion may have a rectangular shape in the cross-section perpendicular to the first base portion, and each of the second sub-protruding portion and the third sub-protruding portion may have a trapezoid shape in the cross-section perpendicular to the first base portion.

According to the above-described exemplary embodiments, the optical film includes the pattern layer in which the shape of the protruding portions is optimized, and thus the display quality of the display device may be improved.

In addition, since the display device includes the optical film having the pattern layer with a relatively low refractive index and the shape and the arrangement intervals of the protruding portions in the pattern layer are optimized, the display quality of the display device in front and side viewing angle directions may be improved.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1:
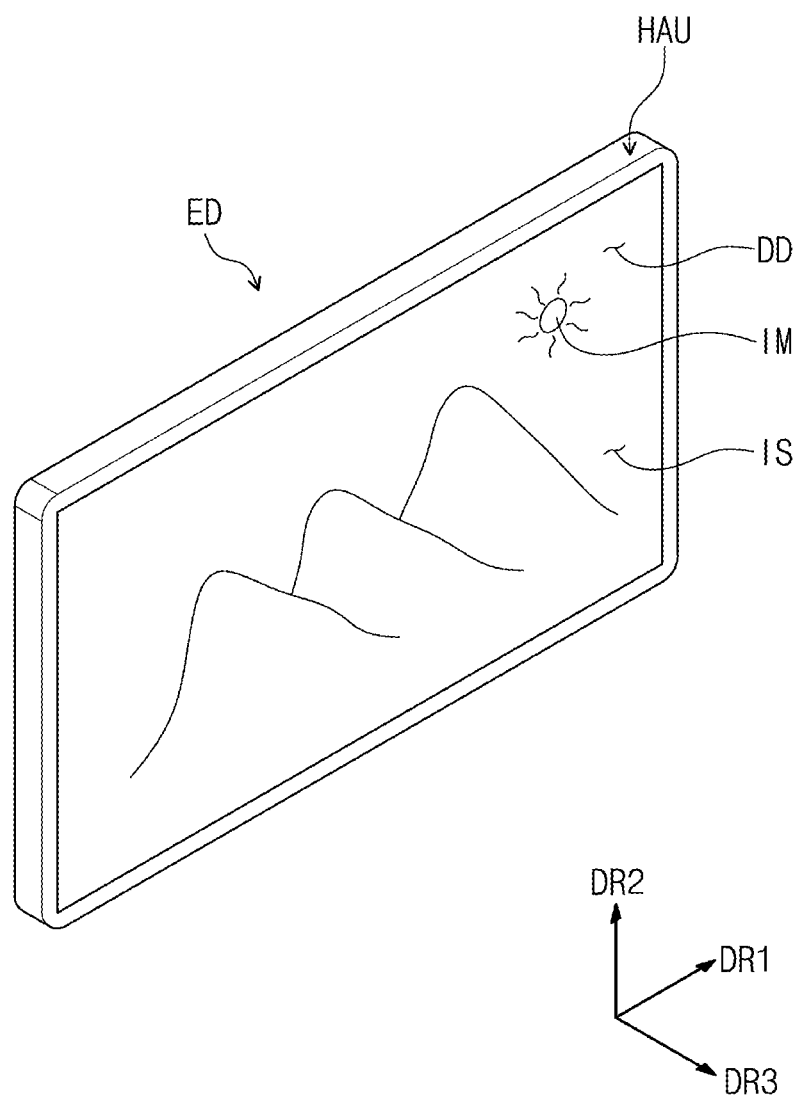
FIG. 1 is a perspective view showing an exemplary embodiment of an electronic device according to the invention.

In the disclosure, the disclosure may be variously modified and realized in many different forms, and thus specific embodiments will be exemplified in the drawings and described in detail hereinbelow. However, the disclosure should not be limited to the specific disclosed forms, and be construed to include all modifications, equivalents, or replacements included in the spirit and scope of the invention.

It will be understood that when an element (or area, layer, or portion) is referred to as being "on", "connected to" or "coupled to" another element or layer, it can be directly on, connected or coupled to the other element or layer or intervening elements or layers may be present.

In contrast, when an element is referred to as being "directly on," "directly connected to" or "directly coupled to" another element or layer, there are no intervening elements or layers present. As used herein, the term "and/or" includes any and all combinations of one or more of the associated listed items.

In the disclosure, the expression "directly disposed" means that no intervening element, such as layer, film, area, or plate, between the element and other elements. For example, the expression "directly disposed" means that two layers or two members are disposed with no additional member such as an adhesive member therebetween.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to accompanying drawings.

Figure 2:
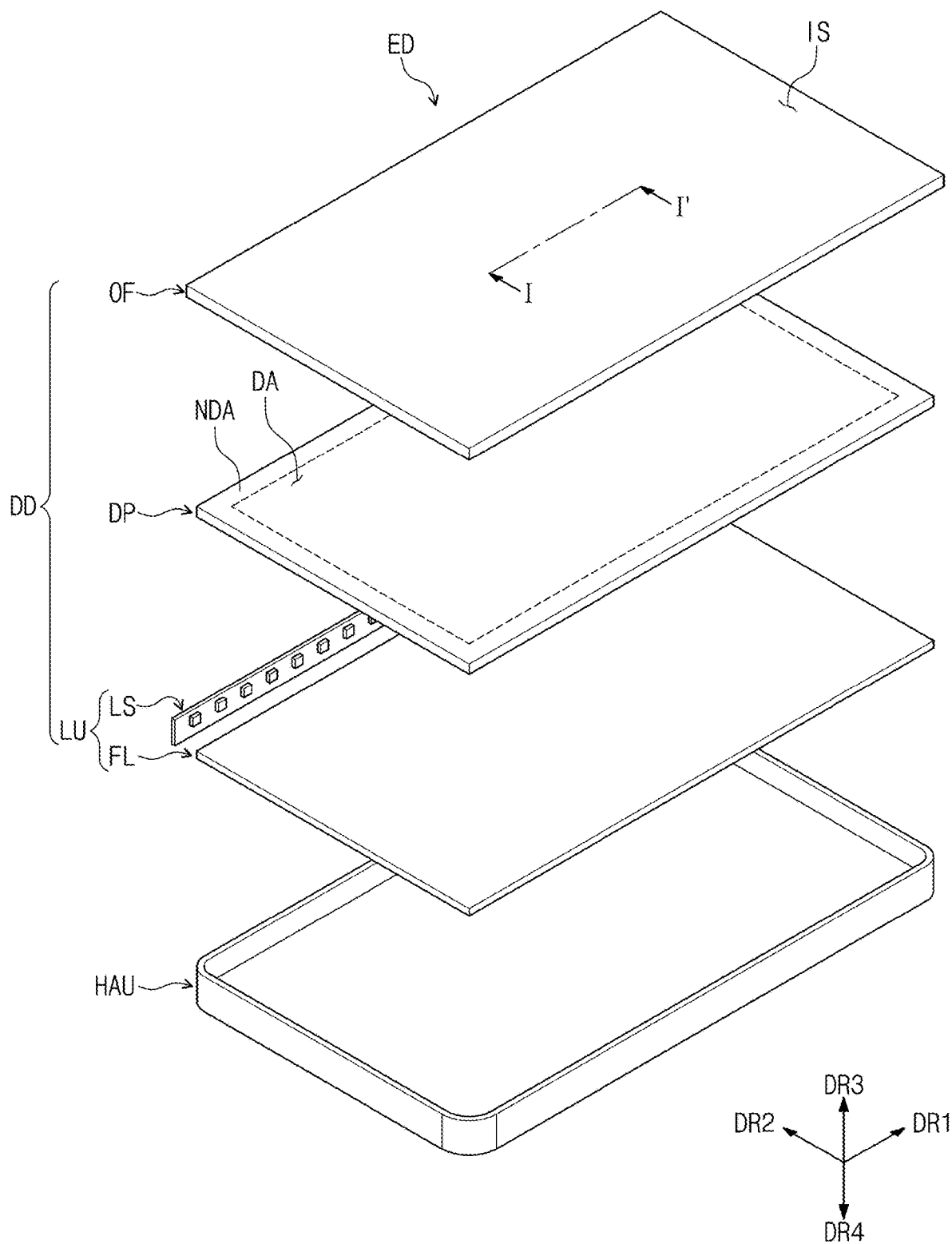
FIG. 2 is an exploded perspective view showing an exemplary embodiment of an electronic device according to the invention.
Figure 3:
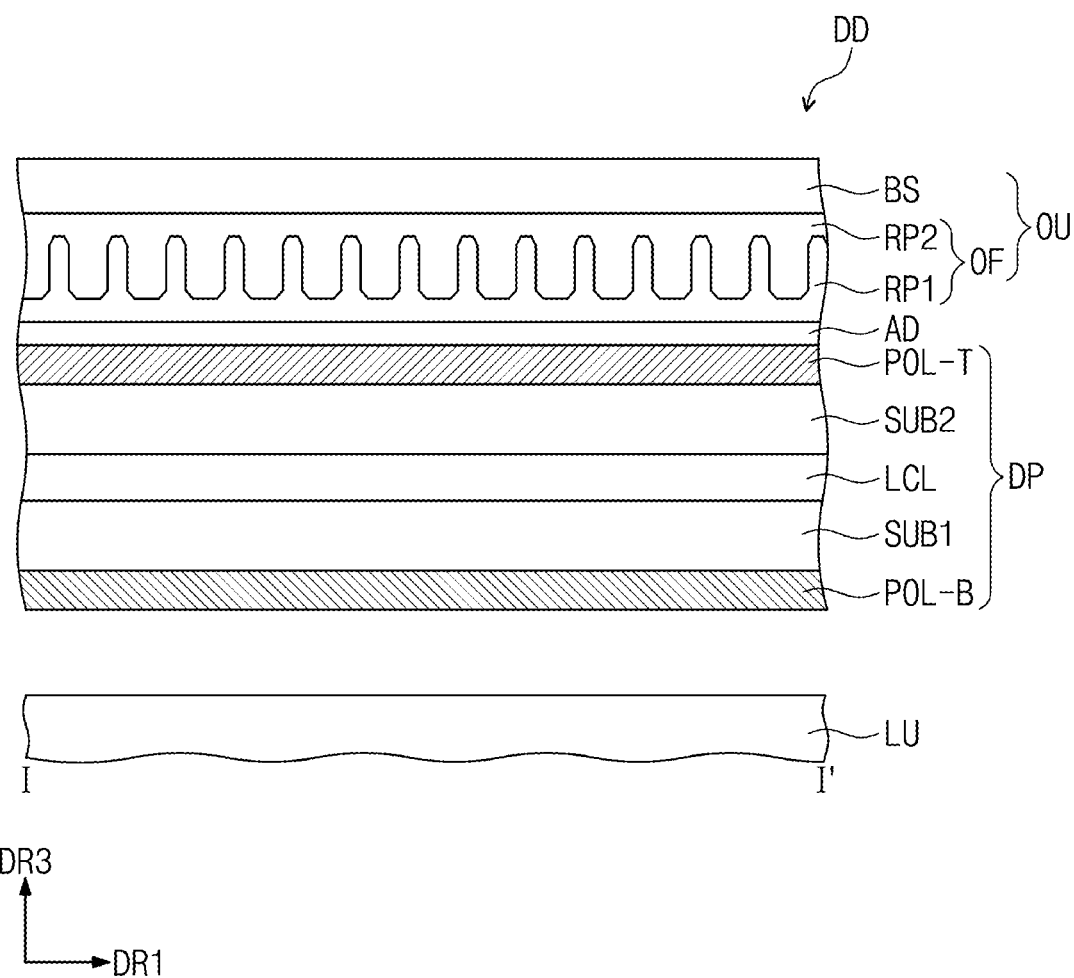
FIG. 3 is a cross-sectional view showing an exemplary embodiment of a display device according to the invention.
Figure 4:
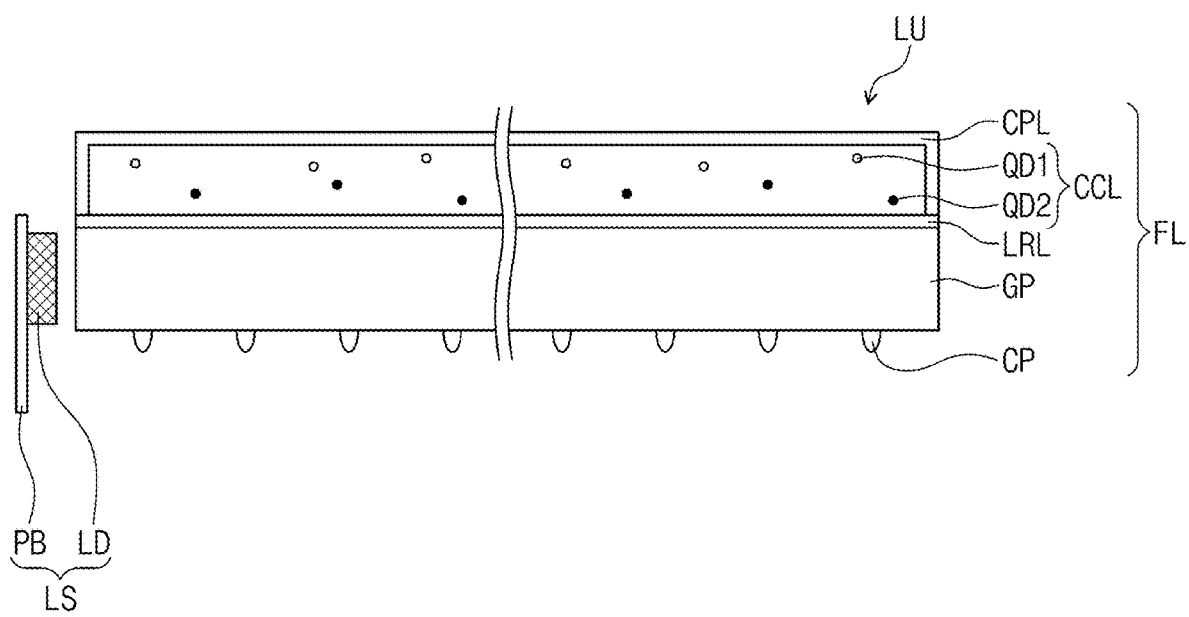
FIG. 4 is a cross-sectional view showing an exemplary embodiment of a light source member according to the invention.

FIG. 1 is a perspective view showing an exemplary embodiment of an electronic device according to the invention. FIG. 2 is an exploded perspective view showing an exemplary embodiment of an electronic device according to the invention. FIG. 3 is a cross-sectional view showing an exemplary embodiment of a display device according to the invention. FIG. 3 shows a cross-sectional view taken along line I-I' of FIG. 2. FIG. 4 is a cross-sectional view showing an exemplary embodiment of a light source member according to the invention.

Figure 5:
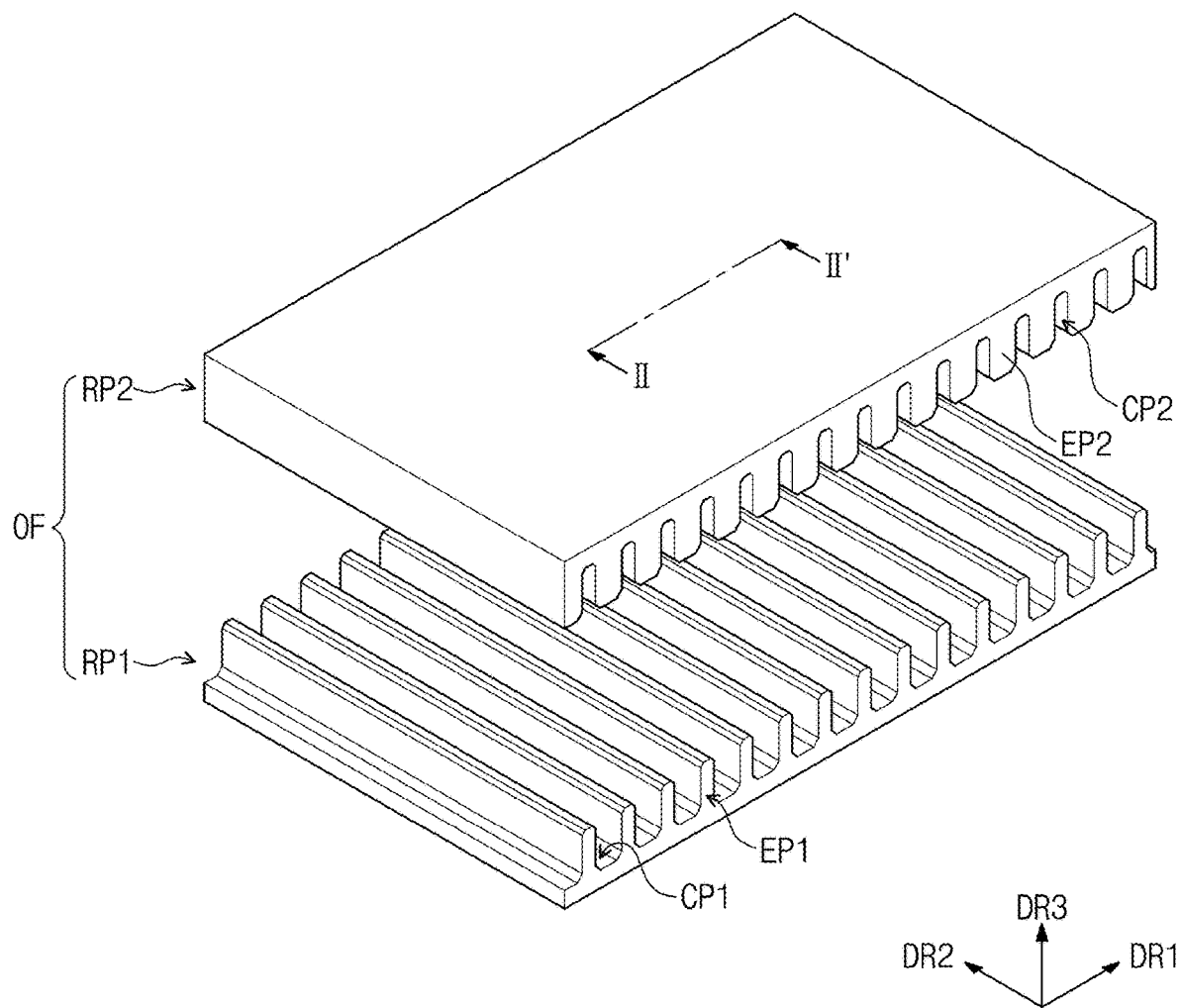
FIG. 5 is an exploded perspective view showing an exemplary embodiment of an optical film according to the invention.
Figure 6:
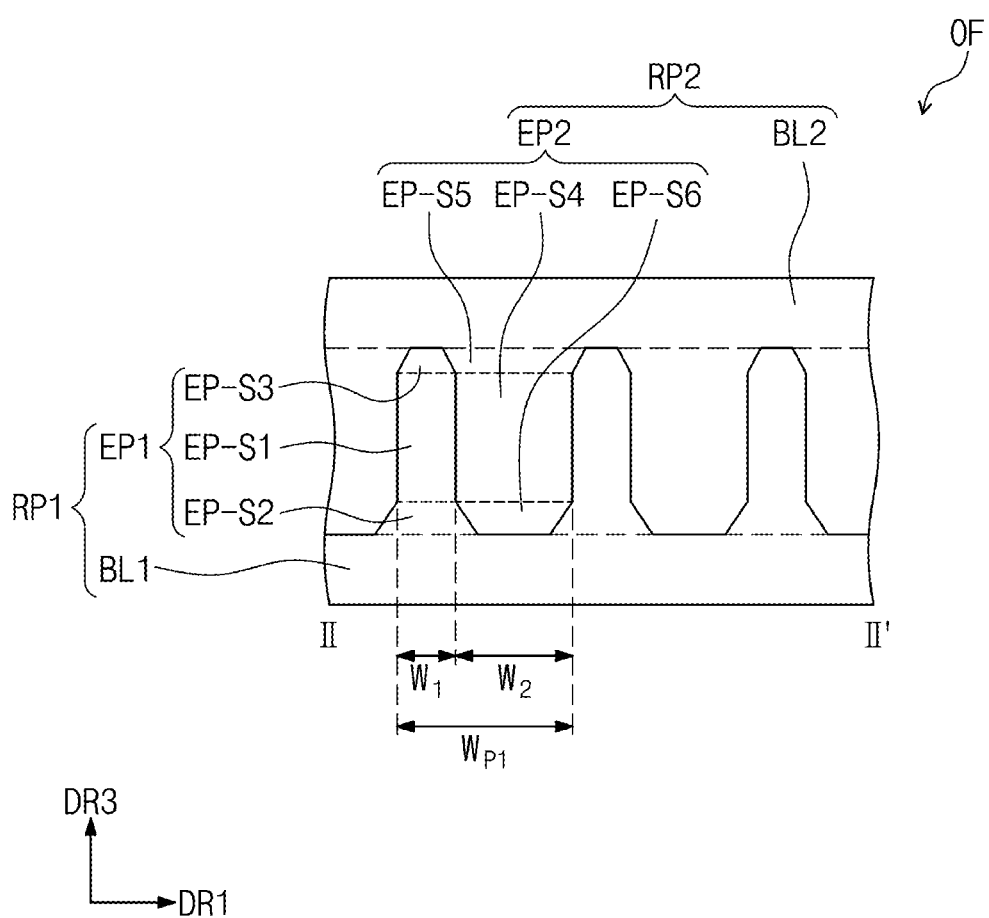
FIG. 6 is a cross-sectional view showing an exemplary embodiment of a portion of an optical film according to the invention.
Figure 7A:
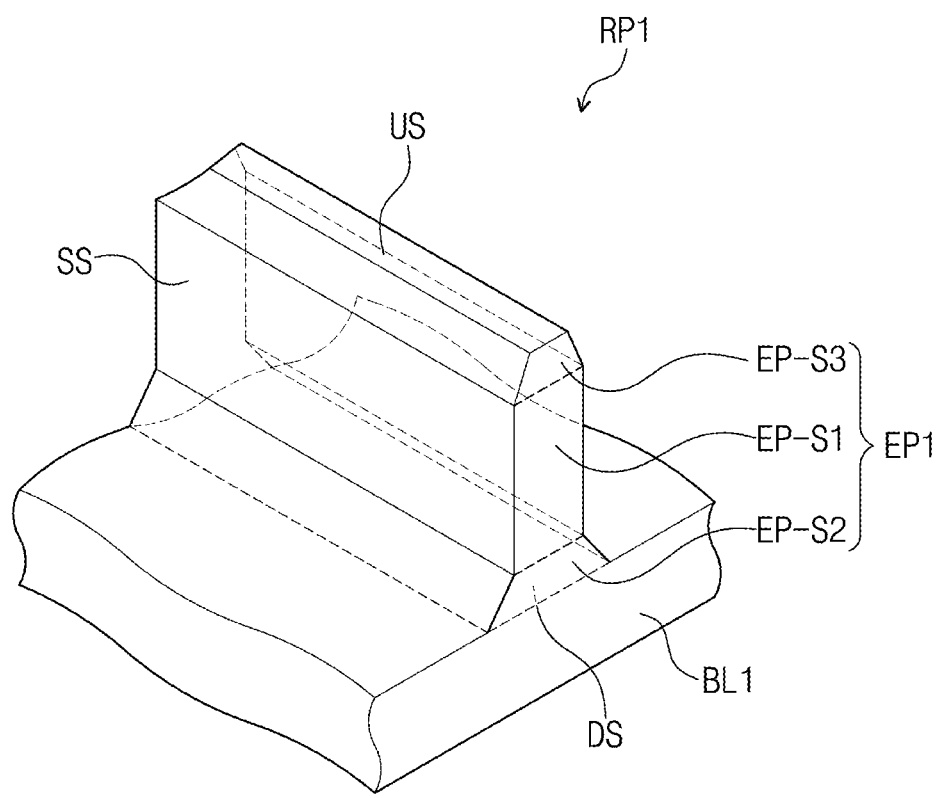
FIG. 7A is a perspective view showing an exemplary embodiment of a portion of an optical film according to the invention.
Figure 7B:
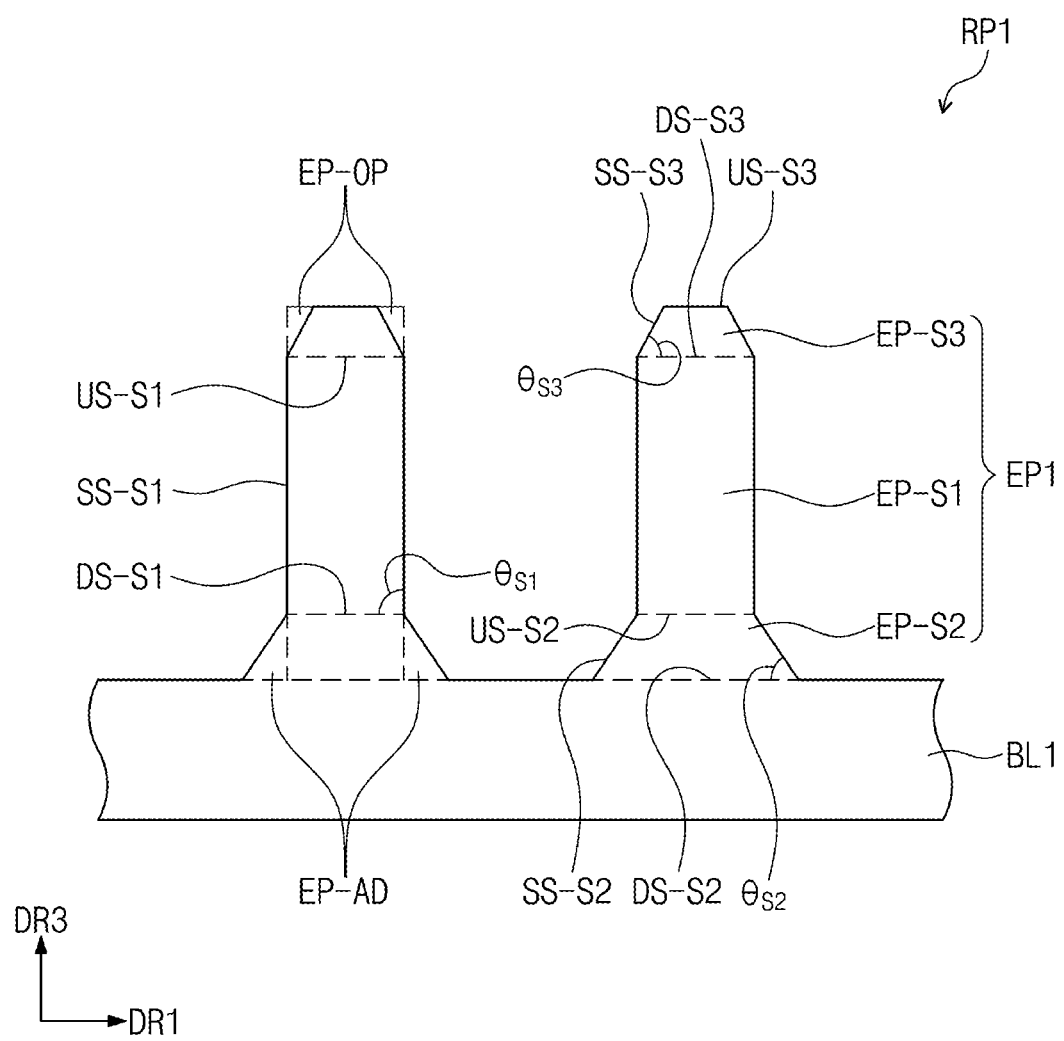
FIG. 7B is a cross-sectional view showing an exemplary embodiment of a portion of an optical film according to the invention.
Figure 7C:
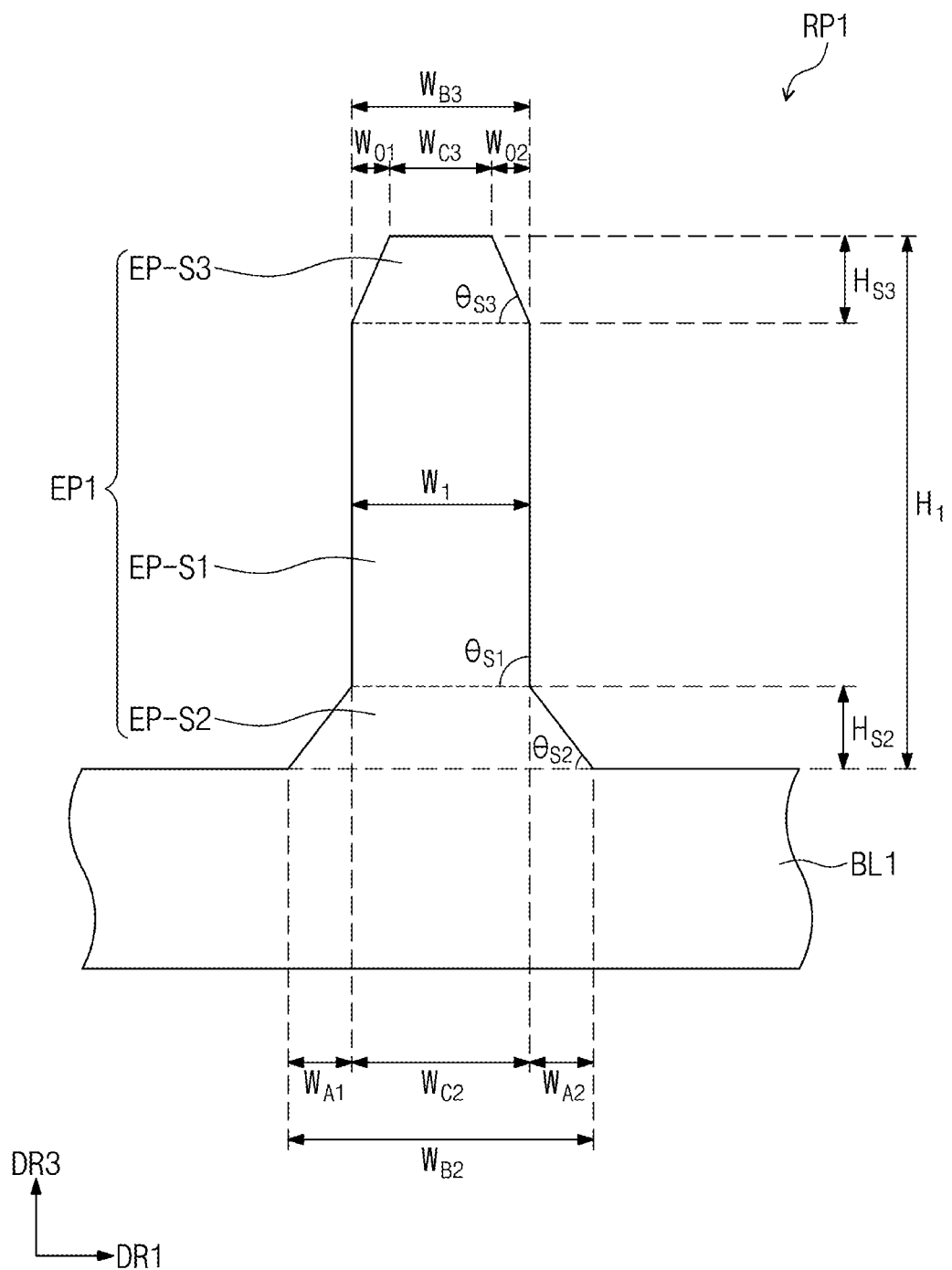
FIG. 7C is a cross-sectional view showing an exemplary embodiment of a portion of an optical film according to the invention.

FIGS. 5 to 7C are views showing an exemplary embodiment of an optical film according to the invention. FIG. 5 is an exploded perspective view showing an exemplary embodiment of an optical film according to the invention. FIG. 6 is a cross-sectional view showing an exemplary embodiment of a portion of an optical film according to the invention, and FIG. 7A is a perspective view showing an exemplary embodiment of a portion of an optical film according to the invention. FIG. 6 shows the cross-sectional view taken along line II-II of FIG. 5. FIGS. 7B and 7C are cross-sectionals view showing an exemplary embodiment of a portion of an optical film according to the invention.

In an exemplary embodiment, an electronic device ED may be a large-sized electronic item, such as a television set, a monitor, or an outdoor billboard. In addition, the electronic device ED may be a small and medium-sized electronic item, such as a personal computer, a notebook computer, a personal digital assistants, a car navigation unit, a game unit, a smartphone, a tablet computer, or a camera. However, these are merely exemplary, and the electronic device ED may be employed in other electronic items as long as they do not depart from the concept of the invention.

The electronic device ED may include a display device DD and a housing HAU.

The electronic device ED displays an image IM through a display surface IS. In FIG. 1, the display surface IS is shown to be substantially parallel to a surface defined by a first directional axis DR1 and a second directional axis DR2 crossing the first directional axis DR1. However, this is merely exemplary, and the display surface IS of the electronic device ED may have a curved shape in another exemplary embodiment.

A third directional axis DR3 indicates a normal line direction of the display surface IS, i.e., a direction in which the image IM is displayed in a thickness direction of the electronic device ED. In addition, a fourth directional axis DR4 indicates a direction opposite to the third directional axis DR3 in the thickness direction of the electronic device ED. Front (or upper) and rear (or lower) surfaces of each member or each unit described below are distinguished from each other by the third directional axis DR3. However, directions indicated by the first, second, third, and fourth directional axes DR1, DR2, DR3, and DR4 are relative to each other and may be changed to other directions.

The housing HAU may accommodate the display device DD. The housing HAU may be disposed to cover the display device DD, but an upper surface that is the display surface IS of the display device DD is exposed. The housing HAU may cover a side surface and a bottom surface of the display device DD and may expose an entire of the upper surface. However, the invention should not be limited thereto or thereby, and in another exemplary embodiment, the housing HAU may cover a portion of the upper surface of the display device DD in addition to the side surface and the bottom surface of the display device DD.

The display device DD may include a light source member LU, a liquid crystal display panel DP, and an optical member OU. The light source member LU may be disposed under the liquid crystal display panel DP, and the optical member OU may be disposed on the liquid crystal display panel DP.

In the exemplary embodiment of the display device DD, the optical member OU includes an optical film OF. The optical film OF is disposed on the liquid crystal display panel DP The optical member OU includes the optical film OF and a base film BS that supports the optical film OF.

FIG. 4 is a cross-sectional view showing the exemplary embodiment of the light source member LU. The light source member LU may include a light source LS and functional layers FL to transmit a light emitted from the light source LS to the liquid crystal display panel DP. The functional layers FL may include a guide panel GP, a low refractive index layer LRL disposed on the guide panel GP, and a color conversion layer CCL disposed on the low refractive index layer LRL. The light source LS may be disposed at at least one side of the guide panel GP. The light source member LU may further include a barrier layer disposed on the color conversion layer CCL. In addition, a plurality of light exit patterns CP may be disposed on a lower surface of the guide panel GP.

In an exemplary embodiment, the light source LS of the light source member LU may include a circuit board PB and a plurality of light emitting element packages LD disposed on the circuit board PB. The light emitting element packages LD may emit lights in the same wavelength range. In addition, different from the above, the light source LS may include a plurality of light emitting element packages LD that emits lights in different wavelength ranges from each other. In an exemplary embodiment, the light emitting element packages LD may emit a first light having a center wavelength in a wavelength range equal to or greater than about 440 nanometers (nm) and equal to or smaller than about 460 nm, for example. In an exemplary embodiment, the light emitting element packages LD may emit a blue light, for example.

In the exemplary embodiment shown in FIG. 2, the light source LS is disposed adjacent to one side surface of the guide panel GP, however, the invention should not be limited thereto or thereby. In other exemplary embodiments, the light source LS may be additionally disposed adjacent to plural side surfaces of the guide panel GP different from that shown in FIG. 2 or FIG. 4.

In addition, different from that shown in drawing figures, the light source LS may be disposed under the guide panel GP. That is, the light source LS may be a direct illumination type light source.

The guide panel GP may be a glass substrate, however, it should not be limited thereto or thereby. The guide panel GP may be a transparent resin substrate. In an exemplary embodiment, the guide panel GP may include an acrylic-based resin, for example.

The light exit patterns CP disposed on the lower surface of the guide panel GP may transmit the light emitted from the light source LS and incident through one side surface of the guide panel GP to another side surface of the guide panel GP or may change a light traveling direction such that the light incident through the lower surface of the guide panel GP is transmitted to a light exit surface that is the upper surface of the guide panel GP.

The low refractive index layer LRL may be disposed on the guide panel GP. The low refractive index layer LRL may be directly disposed on the guide panel GP. The low refractive index layer LRL may have a refractive index smaller than a refractive index of the guide panel GP. Since the low refractive index layer LRL has the refractive index smaller than the refractive index of the guide panel GP, the low refractive index layer LRL may allow the light incident through the side surface of the guide panel GP from the light source LS to be effectively transmitted to another side surface of the guide panel GP, which is relatively spaced apart from the light source LS. That is, the guide panel GP and the low refractive index layer LRL disposed on the guide panel GP of the light source member LU may perform a function of a light guide plate.

The light source member LU includes the color conversion layer CCL disposed on the low refractive index layer LRL. The color conversion layer CCL converts a color of the light provided from the light source LS and transmits the light to the liquid crystal display panel DR In an exemplary embodiment, the light provided from the light source LS may be provided to the liquid crystal display panel DP as a white light after passing through the color conversion layer CCL, for example. In the exemplary embodiment, the color conversion layer CCL may include a plurality of quantum dots QD1 and QD2 that converts the color of the light incident thereto to colors in different wavelength ranges from each other. When the light provided from the light source LS is the first light in the blue light wavelength range, the color conversion layer CCL may include a first quantum dot QD1 that is excited by the blue light to emit a green light and a second quantum dot QD2 that is excited by the blue light to emit a red light.

The barrier layer CPL may be disposed on the color conversion layer CCL. The barrier layer CPL may prevent moisture and/or oxygen (hereinafter, referred to as "moisture/oxygen") from infiltrating into the color conversion layer CCL. The barrier layer CPL may cover the color conversion layer CCL.

The liquid crystal display panel DP is disposed on the light source member LU. The liquid crystal display panel DP may include a first substrate SUB1, a second substrate SUB2 facing the first substrate SUB1, and a liquid crystal layer LCL disposed between the first substrate SUB1 and the second substrate SUB2.

The liquid crystal display panel DP may include a display area DA and a peripheral area NDA surrounding the display area DA. The image is displayed through the display area DA and not displayed through the peripheral area NDA defined adjacent to the display area DA in a plan view. The liquid crystal display panel DP may include a plurality of pixels arranged in the display area.

A signal line and a pixel circuit of the pixels are disposed on one substrate (hereinafter, referred to as an "array substrate") between the first substrate SUB1 and the second substrate SUB2. In an exemplary embodiment, the array substrate may be connected to a main circuit board via a chip-on-film ("COF"), for example. The main circuit board may include a central control circuit disposed therein to drive the liquid crystal display panel DP. The central control circuit may be, but not limited to, a microprocessor. The COF may be, but not limited to, a data driving circuit. In an exemplary embodiment, a gate driving circuit may be disposed (e.g., mounted) on the array substrate or may be directly integrated on the array substrate in a low temperature polysilicon ("LTPS").

The liquid crystal layer LCL includes liquid crystals. In the exemplary embodiment, the liquid crystal layer LCL of the liquid crystal display panel DP may include the liquid crystals vertically aligned. The liquid crystals included in the liquid crystal layer LCL may be vertically aligned with respect to the first substrate SUB1 or the second substrate SUB2. In an exemplary embodiment, the liquid crystals may be aligned at an inclination angle in a range from about 88 degrees to about 90 degrees with respect to an upper surface of the first substrate SUB1 or a lower surface of the second substrate SUB2, for example. In an exemplary embodiment, the liquid crystal display panel DP of the display device DD may be a vertical alignment mode liquid crystal display panel.

However, the invention should not be limited thereto or thereby. That is, as the liquid crystal display panel DP of the display device DD, various display panels, such as a twisted nematic ("TN") mode display panel, a horizontal alignment mode display panel, a super vertical alignment ("SVA") mode display panel, a super patterned vertical alignment ("S-PVA") mode display panel, an optically compensated bend ("OCB") mode display panel, or an electrically controlled birefringence ("ECB") mode display panel, may be used. In addition, the liquid crystal display panel DP may be driven in a driving method different from the above-mentioned driving method and may include liquid crystals aligned in an alignment method different from the above-mentioned alignment method.

The liquid crystal display panel DP may include polarizing layers POL-T and POL-B. FIG. 3 shows a lower polarizing layer POL-B disposed under the first substrate SUB1 that is a lower substrate of the liquid crystal display panel DP and an upper polarizing layer POL-T disposed on the second substrate SUB2 that is an upper substrate of the liquid crystal display panel DP.

The polarizing layers POL-T and POL-B may include a linear polarizer. The linear polarizer may linearly polarize the light provided thereto in one direction. The linear polarizer may be a film-type polarizer including a stretched polymer film. In an exemplary embodiment, the stretched polymer film may be a stretched polyvinyl alcohol-based film, for example. In addition, the linear polarizer may be a coating-type polarizing layer.

In addition, different from that shown in drawing figures, the polarizing layers POL-T and POL-B may be an in-cell polarizing layer independently disposed between the first substrate SUB1 and the liquid crystal layer LCL or between the second substrate SUB2 and the liquid crystal layer LCL.

In an exemplary embodiment, the lower polarizing layer POL-B may be a coating-type polarizing layer or a polarizing layer provided by a deposition process, for example. The lower polarizing layer POL-B may be provided by coating a material including a dichroic dye and a liquid crystal compound. As another way, the lower polarizing layer POL-B may be a wire-grid type polarizing layer. The lower polarizing layer POL-B may be disposed under the liquid crystal display panel DP as a film type. In this case, an adhesive layer may further be disposed between the lower polarizing layer POL-B and the first substrate SUB1.

In addition, the upper polarizing layer POL-T may be a coating-type polarizing layer or a polarizing layer provided by a deposition process.

A transmission axis of the linear polarizer included in the upper polarizing layer POL-T disposed on the second substrate SUB2 and a transmission axis of the linear polarizer included in the lower polarizing layer POL-B may be substantially perpendicular to each other, however, the invention should not be limited thereto or thereby.

The polarizing layers POL-T and POL-B may further include a phase retardation layer and an optical compensation layer. The phase retardation layer and the optical compensation layer may be disposed on an upper surface or a lower surface of the linear polarizer, and as an example, an adhesive layer may further be disposed between the linear polarizer and the phase retardation layer or between the linear polarizer and the optical compensation layer.

The optical member OU may be disposed on the liquid crystal display panel DP in the display device DD in the exemplary embodiment. The optical member OU may include the optical film OF and the base film BS.

The optical film OF may be disposed on the liquid crystal display panel DP. In the exemplary embodiment, the optical film OF may be disposed on the upper polarizing layer POL-T. In addition, an adhesive layer AD may be disposed between the upper polarizing layer POL-T and the optical film OF.

The base film BS may be disposed on the optical film OF. The base film BS may serve as a supporter to support the optical film OF or a protective layer to protect the optical film OF. In an exemplary embodiment, a polyethylene terephthalate ("PET") film may be used as the base film BS, for example.

Referring to FIGS. 5 to 7C, the optical film OF may include a first pattern layer RP1 and a second pattern layer RP2. The second pattern layer RP2 may be disposed on the first pattern layer RP1.

The first pattern layer RP1 and the second pattern layer RP2 may have different refractive indices from each other. In the exemplary embodiment, a difference in refractive index between the first pattern layer RP1 and the second pattern layer RP2 may be in a range equal to or greater than about 0.2 and equal to or smaller than about 0.25, for example.

According to the optical film OF of the exemplary embodiment, a first refractive index of the first pattern layer RP1 may be smaller than a second refractive index of the second pattern layer RP2. The first refractive index of the first pattern layer RP1 may be in a range from about 1.0 to about 1.5, and the second refractive index of the second pattern layer RP2 may be in a range from about 1.2 or to about 1.7. In an exemplary embodiment, the second refractive index of the second pattern layer RP2 may be equal to or less than about 1.6, the first refractive index of the first pattern layer RP1 may be equal to or less than about 1.4, and the second refractive index of the second pattern layer RP2 may be greater than the first refractive index of the first pattern layer RP1 by about 0.2 to about 0.25, for example.

According to the optical film OF of the exemplary embodiment, the first pattern layer RP1 may include a first base portion BL1 and a plurality of first protruding portions EP1. The first protruding portions EP1 may be arranged and disposed on the first base portion BL1. In addition, the second pattern layer RP2 may be disposed on the first pattern layer RP1, and the second pattern layer RP2 may be filled between the first protruding portions EP1.

According to the optical film OF of the exemplary embodiment, the second pattern layer RP2 may include a second base portion BL2 and a plurality of second protruding portions EP2. According to the optical film OF of the exemplary embodiment, the second protruding portions EP2 may be arranged and disposed under the second base portion BL2. According to the optical film OF of the exemplary embodiment, the first protruding portions EP1 may be alternately arranged with the second protruding portions EP2.

In the exemplary embodiment, each of the first protruding portions EP1 and the second protruding portions EP2 may have a stripe shape extending in one direction. Each of the first protruding portions EP1 and the second protruding portions EP2 may be arranged in a stripe pattern on a plane surface defined by the first directional axis DR1 and the second directional axis DR2.

Referring to FIG. 5, each of the first protruding portions EP1 and the second protruding portions EP2 may extend in the second directional axis DR2. According to FIGS. 1 to 5, the extension direction of the first protruding portions EP1 and the second protruding portions EP2 of the optical film OF may be a direction substantially parallel to an up-and-down direction in a viewing direction of the display surface IS of the electronic device ED. That is, the extension direction of the first protruding portions EP1 and the second protruding portions EP2 of the optical film OF may be a direction substantially parallel to short sides of the display device DD shown in FIGS. 1 and 2.

In FIG. 1, a left-and-right direction of the display surface IS of the electronic device ED is a long side direction, and the up-and-down direction of the display surface IS of the electronic device ED is a short side direction, however, the invention should not be limited thereto or thereby. Different from that shown in drawing figures, in other exemplary embodiments, the left-and-right direction of the display surface IS of the electronic device ED in the direction in which the user sees the electronic device ED may be the short side direction, and the up-and-down direction of the display surface IS of the electronic device ED may be the long side direction. In this case, the extension direction of the first and second protruding portions EP1 and EP2 of the optical film OF may be substantially parallel to the long sides of the display device DD.

According to the optical film OF of the exemplary embodiment, each of the first protruding portions EP1 may include a first sub-protruding portion EP-S1, a second sub-protruding portion EP-S2 disposed between the first base portion BL1 and the first sub-protruding portion EP-S1, and a third sub-protruding portion EP-S3 disposed on the first sub-protruding portion EP-S1.

The first sub-protruding portion EP-S1 may have a first width $W_1$ in a cross-section perpendicular to the first base portion BL1. The first sub-protruding portion EP-S1 may include a first sub-bottom surface DS-S1 adjacent to the second sub-protruding portion EP-S2, a first sub-upper surface US-S1 facing the first sub-bottom surface DS-S1, and a first sub-side surface SS-S1 connecting the first sub-bottom surface DS-S1 and the first sub-upper surface US-S1.

The second sub-protruding portion EP-S2 may have a width that gradually increases from the first sub-protruding portion EP-S1 toward the first base portion BL1. The second sub-protruding portion EP-S2 may include a second sub-bottom surface DS-S2 adjacent to the first base portion BL1, a second sub-upper surface US-S2 facing the second sub-bottom surface DS-S2, and a second sub-side surface SS-S2 connecting the second sub-bottom surface DS-S2 and the second sub-upper surface US-S2. The second sub-bottom surface DS-S2 and the second sub-upper surface US-S2 may be referred to as a "lower surface" and an "upper surface" of the second sub-protruding portion EP-S2, respectively.

The third sub-protruding portion EP-S3 may be disposed on the first sub-protruding portion EP-S1 and may have a width that gradually decreases as a distance from the first sub-protruding portion EP-S1 increases. The third sub-protruding portion EP-S3 may include a third sub-bottom surface DS-S3 adjacent to the first sub-protruding portion EP-S1, a third sub-upper surface US-S3 facing the third sub-bottom surface DS-S3, and a third sub-side surface SS-S3 connecting the third sub-bottom surface DS-S3 and the third sub-upper surface US-S3. The third sub-bottom surface DS-S3 and the third sub-upper surface US-S3 may be referred to as a "lower surface" and an "upper surface" of the third sub-protruding portion EP-S3, respectively.

In the first protruding portion EP1, a distance between the first sub-side surfaces SS-S1 facing each other in a cross-section of the first sub-protruding portion EP-S1 perpendicular to the first base portion BL1 may be uniform. That is, the width $W_1$ of the first sub-protruding portion EP-S1 may be uniform in the cross-section perpendicular to the first base portion BL1. However, the invention should not be limited thereto or thereby, and in another exemplary embodiment, the width $W_1$ of the first sub-protruding portion EP-S1 may gradually increase from the first sub-upper surface US-S1 to the first sub-bottom surface DS-S1.

Referring to FIGS. 6 to 7C, the first sub-protruding portion EP-S1 may have a rectangular shape in a cross-section substantially parallel to a plane surface defined by the first directional axis DR1 and the third directional axis DR3. In an exemplary embodiment, the first sub-side surface SS-S1 may be substantially perpendicular to the first sub-bottom surface DS-S1 and the first sub-upper surface US-S1 of the optical film OF. When viewed in a cross-section, the first sub-side surface SS-S1 may have an inclination angle $\theta s1$ of about 90 degrees with respect to the first sub-bottom surface DS-S1.

The inclination angle $\theta s1$ of the first sub-side surface SS-S1 with respect to the first sub-bottom surface DS-S1 may be substantially close to 90 degrees, however, the invention should not be limited thereto or thereby. That is, the inclination angle $\theta s1$ of the first sub-side surface SS-S1 with respect to the first sub-bottom surface DS-S1 may be in a range from about 86 degrees to about 90 degrees.

A spacing interval Wp1 between the first protruding portions EP1 adjacent to each other in the cross-section of the first protruding portions EP1 perpendicular to the first base portion BL1 and the width W1 of the first sub-protruding portion EP-S1 may have the relationship represented by the following Equation 1.

$$0.15 \leq W_1/W_{P1} \leq 0.45 \quad \text{Equation 1}$$

In Equation 1, the spacing interval Wp1 between the first protruding portions EP1 is obtained by adding the width W1 of the first sub-protruding portions EP-S1 and a minimum spacing interval W2 between the first sub-protruding portions EP-S1 of the first protruding portions EP1. In addition, W1 and W2 correspond to distances in a direction perpendicular to the extension direction of the first protruding portions EP1. Referring to FIG. 6, the spacing interval Wp1 between the first protruding portions EP1 and the width W1 of each of the first sub-protruding portions EP-S1 may indicate distances in the direction substantially parallel to the first directional axis DR1.

In an exemplary embodiment, the width W1 of each of the first sub-protruding portions EP-S1 may be within a range from about 3 micrometers to about 5 micrometers, for example. In addition, the spacing interval Wp1 between the first protruding portions EP1 may be within a range from about 12 micrometers to about 16 micrometers, for example.

The spacing interval Wp1 between the first protruding portions EP1 adjacent to each other in the cross-section of the first protruding portions EP1 perpendicular to the first base portion BL1 and a height H1 of the first protruding portions EP1 may have the relationship represented by the following Equation 2.

$$0.75 \leq H_1/W_{P1} \leq 1.35 \quad \text{Equation 2}$$

In Equation 2, as described in Equation 1, the spacing interval Wp1 is obtained by adding the width W1 of each of the first sub-protruding portions EP-S1 and the minimum spacing interval W2 between the first sub-protruding portions EP-S1 adjacent to each other, and W1 and W2 correspond to distances in a direction perpendicular to the extension direction of the first protruding portions EP1. The height H1 of the first protruding portions EP1 corresponds to a height in the third directional axis DR3 that is the thickness direction of the optical film OF.

In an exemplary embodiment, the spacing interval Wp1 between the first protruding portions EP1 may be within a range from about 12 micrometers to about 16 micrometers, and the height H1 of the first protruding portions EP1 may be within a range from about 12 micrometers to about 16 micrometers, for example.

Referring to FIG. 5, the first pattern layer RP1 may include the first protruding portions EP1, and a first concave portion CP1 may be defined between the first protruding portions EP1 adjacent to each other. The second pattern layer RP2 may include the second protruding portions EP2, and a second concave portion CP2 may be defined between the second protruding portions EP2.

Grooves defined by the first protruding portions EP1 and the first concave portions CP1 of the first pattern layer RP1 may correspond to grooves defined by the second concave portions CP2 and the second protruding portions EP2 of the second pattern layer RP2. In an exemplary embodiment, the first protruding portions EP1 of the first pattern layer RP1 may be disposed corresponding to the second concave portions CP2 of the second pattern layer RP2, and the second protruding portions EP2 of the second pattern layer RP2 may be disposed corresponding to the first concave portions CP1 of the first pattern layer RP1, for example. That is, the first protruding portions EP1 may be inserted into the second concave portions CP2, and the second protruding portions EP2 may be inserted into the first concave portions CP1.

In the exemplary embodiment of the optical film OF described with reference to FIGS. 5 to 7C, the first sub-side surface SS-S1 of the first sub-protruding portions EP-S1 is perpendicular to the first sub-bottom surface DS-S, and the first protruding portions EP1 may satisfy the relationships represented by Equations 1 and 2.

In the exemplary embodiment of the optical film OF, the first sub-protruding portion EP-S1 may have a rectangular shape in the cross-section perpendicular to the first base portion BL1, and each of the second sub-protruding portion EP-S2 and the third sub-protruding portion EP-S3 may have a trapezoid shape in the cross-section perpendicular to the first base portion BL1.

Referring to FIGS. 7B and 7C, the first sub-protruding portion EP-S1 may have the rectangular shape in a cross-section substantially parallel to a plane surface defined by the first directional axis DR1 and the third directional axis DR3, and the second sub-protruding portion EP-S2 disposed adjacent to the first sub-bottom surface DS-S1 of the first sub-protruding portion EP-S1 may have the trapezoid shape whose width gradually increases from the first sub-bottom surface DS-S1 to the first base portion BL1. In addition, the third sub-protruding portion EP-S3 disposed adjacent to the first sub-upper surface US-S1 of the first sub-protruding portion EP-S1 may have the trapezoid shape whose width gradually decreases as a distance from the first sub-upper surface US-S1 increases.

That is, the optical film OF in the exemplary embodiment may include the first sub-protruding portion EP-S1 whose cross-section has the rectangular shape and may include a side surface protruding portion EP-AD in an area adjacent to the lower surface, and a chamfered portion EP-OP may be defined in an area adjacent to the upper surface.

According to the optical film OF of the exemplary embodiment, the second sub-protruding portion EP-S2 may have a trapezoid shape, and the second sub-side surface SS-S2 may have an inclination angle $\theta s2$ in a range from about 69 degrees to about 83 degrees with respect to the second sub-bottom surface DS-S2 of the second sub-protruding portion EP-S2.

In addition, a width $W_{B2}$ of the second sub-bottom surface DS-S2 of the second sub-protruding portion EP-S2 of the optical film OF in the exemplary embodiment may be greater than a width $W_{C2}$ of the second sub-upper surface US-S2. The width $W_{B2}$ of the second sub-bottom surface DS-S2 may be obtained by adding the width $W_{C2}$ of the second sub-upper surface US-S2 and widths $W_{A1}$ and $W_{A2}$ of the side surface protruding portion EP-AD. The width $W_{C2}$ of the second sub-upper surface US-S2 may be equal to the width of the first sub-bottom surface DS-S1 of the first sub-protruding portion EP-S1. In addition, a maximum width $W_2$ of the second sub-bottom surface DS-S2 and a maximum width $W_{C2}$ of the second sub-upper surface US-S2 may satisfy the following Equation 3.

$$0.67 \leq W_{C2}/W_{B2} \leq 0.91 \qquad \text{Equation 3}$$

The maximum width $W_{B2}$ of the second sub-bottom surface DS-S2 and the maximum width $W_{C2}$ of the second sub-upper surface US-S2 correspond to widths in the direction corresponding to the first directional axis DR1.

In an exemplary embodiment, each of the widths $W_{A1}$ and $W_{A2}$ of the side surface protruding portion EP-AD may be in a range from about 0.25 micrometers to about 0.75 micrometers, for example. In addition, the maximum width $W_{C2}$ of the second sub-upper surface US-S2 may be in a range from about 3 micrometers to about 5 micrometers, for example.

Further, the cross-section of the first protruding portion EP1 of the optical film OF may have a shape satisfying the following Equation 4.

$$0.06 \leq H_{S2}/H_1 \leq 0.17 \qquad \text{Equation 4}$$

In Equation 4, $H_1$ denotes a maximum height in the thickness direction of the first protruding portion EP1 in the cross-section of the first protruding portion EP1 perpendicular to the first base portion BL1, and $H_{S2}$ denotes a maximum height in the thickness direction of the second sub-protruding portion EP-S2 in the cross-section. The maximum height $H_1$ in the thickness direction of the first protruding portion EP1 and the maximum height $H_{S2}$ in the thickness direction of the second sub-protruding portion EP-S2 correspond to heights in the direction corresponding to the third directional axis DR3.

The height $H_{S2}$ in the thickness direction of the second sub-protruding portion EP-S2 may be in a range from about 1 micrometers to about 2 micrometers, for example. In addition, the maximum height $H_1$ in the thickness direction of the first protruding portion EP1 may be in a range from about 12 micrometers to about 16 micrometers, for example.

According to the optical film OF of the exemplary embodiment, the third sub-protruding portion EP-S3 may have a trapezoid shape, and the third sub-side surface SS-S3 may have an inclination angle $\theta s3$ in a range from about 69 degrees to about 83 degrees with respect to the third sub-bottom surface DS-S3 of the third sub-protruding portion EP-S3.

In addition, a width $W_{B3}$ of the third sub-bottom surface DS-S3 of the third sub-protruding portion EP-S3 of the optical film OF in the exemplary embodiment may be greater than a width $W_{C3}$ of the third sub-upper surface US-S3. The width $W_{B3}$ of the third sub-bottom surface DS-S3 may be obtained by adding the width $W_{C3}$ of the third sub-upper surface US-S3 and widths $W_{O1}$ and $W_{O2}$ of the chamfered portion EP-OP. The width $W_{B3}$ of the third sub-bottom surface DS-S3 may be equal to the width of the first sub-upper surface US-S1 of the first sub-protruding portion EP-S1. In addition, a maximum width $W_{B3}$ of the third sub-bottom surface DS-S3 and a maximum width $W_{C3}$ of the third sub-upper surface US-S3 may satisfy the following Equation 5.

$$0.67 \leq W_{C3}/W_{B3} \leq 0.90 \qquad \text{Equation 5}$$

The maximum width $W_{B3}$ of the third sub-bottom surface DS-S3 and the maximum width $W_{C3}$ of the third sub-upper surface US-S3 correspond to widths in the direction corresponding to the first directional axis DR1.

Each of the widths $W_{O1}$ and $W_{O2}$ of the chamfered portion EP-OP removed from an upper end of the first protruding portion EP1 may be in a range from about 0.25 micrometers to about 0.5 micrometers, for example. In addition, the maximum width $W_{B3}$ of the third sub-bottom surface DS-S3 may be in a range from about 3 micrometers to about 5 micrometers, for example.

Further, the cross-section of the first protruding portion EP1 of the optical film OF may have a shape satisfying the following Equation 6.

$$0.06 \leq H_{S3}/H_1 \leq 0.17 \qquad \text{Equation 6}$$

In Equation 6, $H_1$ denotes the maximum height in the thickness direction of the first protruding portion EP1 in the cross-section of the first protruding portion EP1 perpendicular to the first base portion BL1, and $H_{S3}$ denotes a maximum height in the thickness direction of the third sub-protruding portion EP-S3 in the cross-section. The maximum height $H_1$ in the thickness direction of the first protruding portion EP1 and the maximum height $H_{S3}$ in the thickness direction of the third sub-protruding portion EP-S3 correspond to heights in the direction corresponding to the third directional axis DR3.

The height $H_{S3}$ in the thickness direction of the third sub-protruding portion EP-S3 may be in a range from about 1 micrometers to about 2 micrometers, for example. In addition, the maximum height $H_1$ in the thickness direction of the first protruding portion EP1 may be in a range from about 12 micrometers to about 16 micrometers, for example.

When the optical film includes the first pattern layer including the first protruding portions and the second pattern layer having the refractive index higher than that of the first pattern layer and each of the first protruding portions satisfies the relationships represented by Equations 1 to 6, the optical film may be used for the improvement of frontal characteristics and side viewing angle characteristics of the display device.

The shape of the optical film OF should not be limited to the exemplary embodiments described with reference to FIGS. 5 to 7C. In an exemplary embodiment, the first protruding portion EP1 of the optical film OF may further include at least one additional sub-protruding portion disposed at least one of between the first sub-protruding portion EP-S1 and the second sub-protruding portion EP-S2 and between the second sub-protruding portion EP-S2 and the first base portion BL1, for example. The additional sub-protruding portion may have a trapezoid shape or a rectangular shape in its cross-section. In the case where the additional sub-protruding portion has the trapezoid shape in its cross-section, a side surface inclination angle of the trapezoid shape and the inclination angle of the second sub-side surface SS-S2 of the second sub-protruding portion EP-S2 may be different from each other.

In addition, in an exemplary embodiment, the first protruding portion EP1 of the optical film OF may further include at least one additional sub-protruding portions disposed at least one of between the first sub-protruding portion EP-ST and the third sub-protruding portion EP-S3 and between the third sub-protruding portion EP-S3 and the second base portion BL2. The additional sub-protruding portion may have a trapezoid shape or a rectangular shape in its cross-section. In the case where the additional sub-protruding portion has the trapezoid shape in its cross-section, a side surface inclination angle of the trapezoid shape and the inclination angle of the third sub-side surface SS-S3 of the third sub-protruding portion EP-S3 may be different from each other.

Referring to FIG. 6, the optical film OF includes the second pattern layer RP2 disposed on the first pattern layer RP1. The second pattern layer RP2 may include a fourth sub-protruding portion EP-S4 having a second width $W_2$ in a cross-section perpendicular to the second base portion BL2, a fifth sub-protruding portion EP-S5 disposed between the fourth sub-protruding portion EP-S4 and the second base portion BL2, and a sixth sub-protruding portion EP-S6 disposed between the first base portion BL1 and the fourth sub-protruding portion EP-S4.

The fifth sub-protruding portion EP-S5 may have a width that gradually increases from the fourth sub-protruding portion EP-S4 to the second base portion BL2. The sixth sub-protruding portion EP-S6 may be disposed between the fourth sub-protruding portion EP-S4 and the first base portion BL1 and may have a width that gradually decreases as a distance from the fourth sub-protruding portion EP-S4 increases.

The fourth sub-protruding portion EP-S4 of the optical film OF may have a rectangular shape in a cross-section perpendicular to the second base portion BL2, and each of the fifth sub-protruding portion EP-S5 and the sixth sub-protruding portion EP-S6 may have a trapezoid shape in the cross-section perpendicular to the second base portion BL2.

A distance between side surfaces facing each other in a cross-section of the fourth sub-protruding portion EP-S4 perpendicular to the second base portion BL2 in the second protruding portion EP2 may be uniform. That is, the width $W_2$ of the fourth sub-protruding portion EP-S4 in the cross-section perpendicular to the second base portion BL2 may be uniform.

In the exemplary embodiment shown in FIG. 6, the second pattern layer RP2 may have a refractive index greater than a refractive index of the first pattern layer RP1. In addition, the width $W_1$ of the first sub-protruding portion EP-S1 of the first pattern layer RP1 having the relatively small refractive index may be smaller than the width $W_2$ of the fourth sub-protruding portion EP-S4 of the second pattern layer RP2. In an exemplary embodiment, the width $W_2$ of the fourth sub-protruding portion EP-S4 of the second pattern layer RP2 may correspond to the minimum spacing interval between the first sub-protruding portions EP-S1 adjacent to each other.

Figure 8:
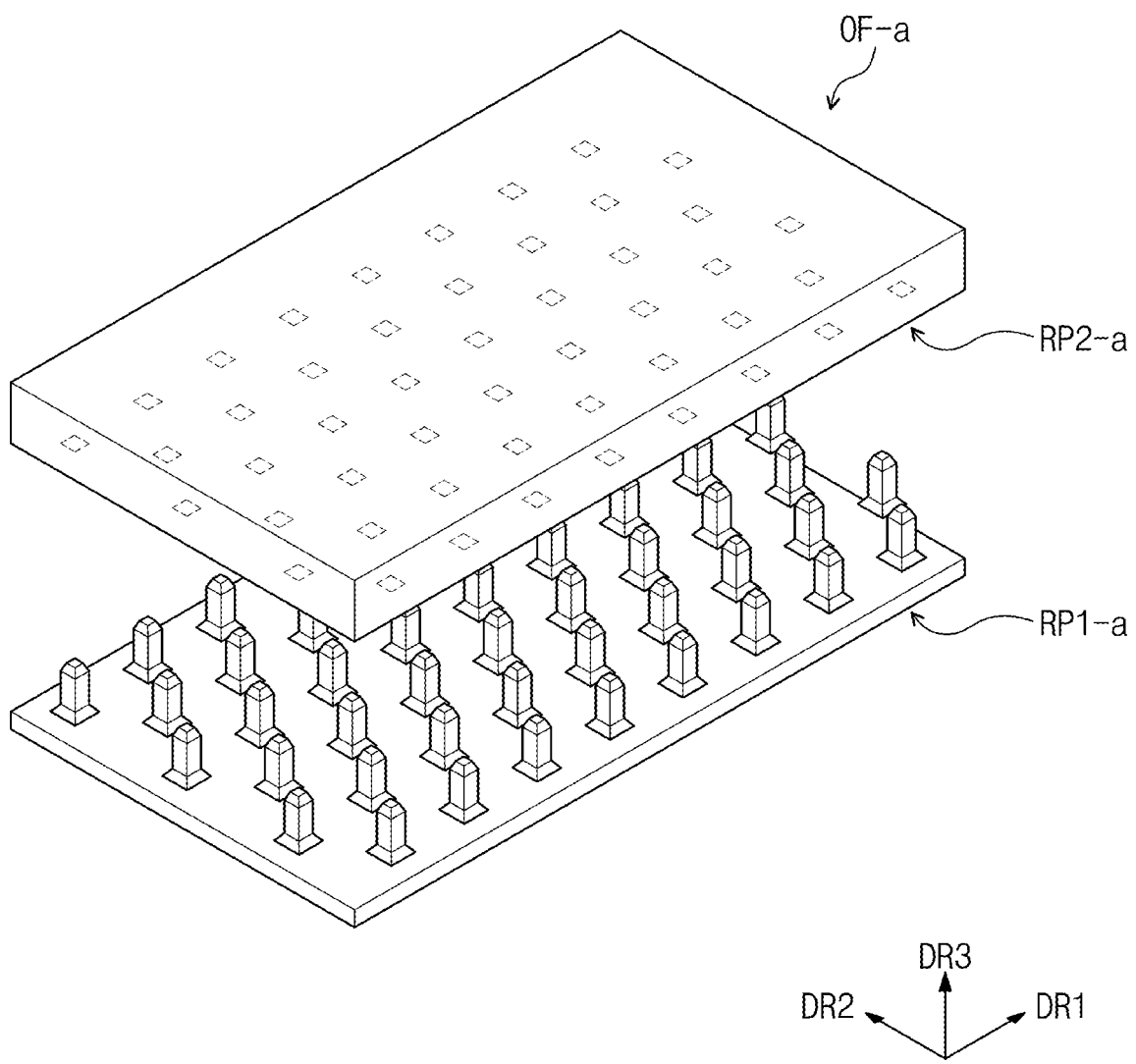
FIG. 8 is an exploded perspective view showing an exemplary embodiment of an optical film according to the invention.
Figure 9:
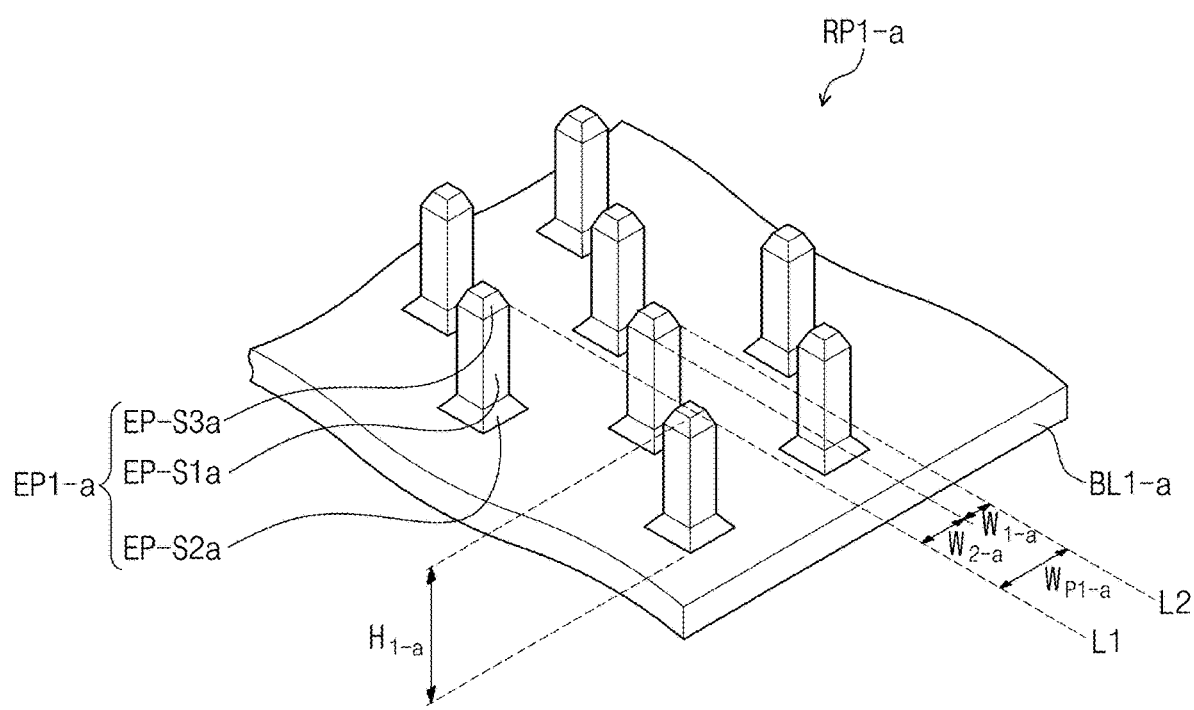
FIG. 9 is a perspective view showing an exemplary embodiment of a portion of an optical film according to the invention.
Figure 10:
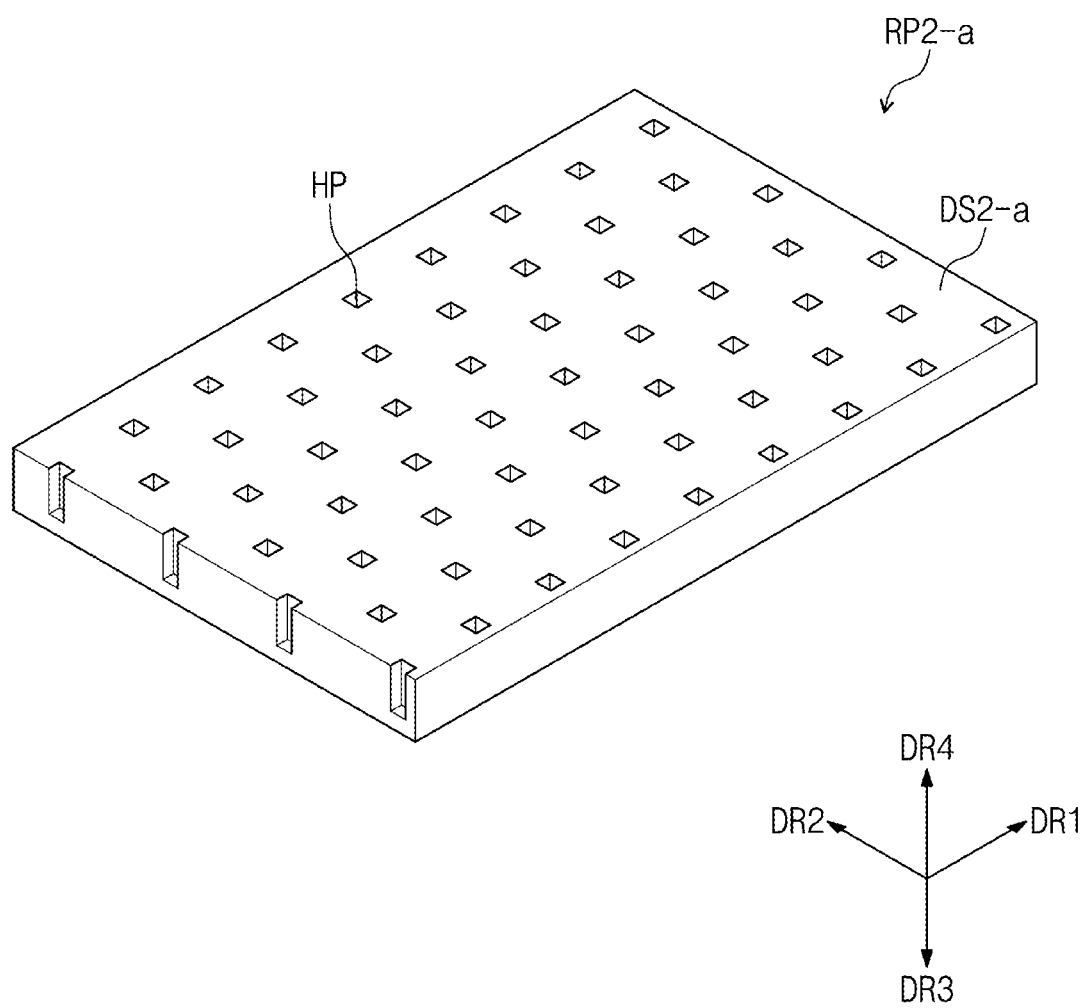
FIG. 10 is a perspective view showing an exemplary embodiment of a portion of an optical film according to the invention.

FIG. 8 is an exploded perspective view showing an exemplary embodiment of an optical film according to the invention, and FIGS. 9 and 10 are perspective views showing an exemplary embodiment of a portion of an optical film according to the invention. The optical film OF-a described hereinafter with reference to FIGS. 8 to 10 may be included in the display device DD described with reference to FIGS. 1 to 3. Hereinafter, the same descriptions of the optical film OF-a shown in FIGS. 8 to 10 as those described with reference to FIGS. 5 to 7C will be omitted, and thus different features will be mainly described.

Referring to FIG. 8, the optical film OF-a in the exemplary embodiment may include a first pattern layer RP1-a and a second pattern layer RP2-a disposed on the first pattern layer RP1-a. Referring to FIG. 9, the first pattern layer RP1-a may include a first base portion BL1-a and a plurality of first protruding portions EP1-a. In addition, each first protruding portion EP1-a of the first pattern layer RP1-a may have a pillar shape having a height $H_{1-a}$ in the direction that is the thickness direction and corresponds to the third directional axis DR3.

The first protruding portion EP1-a may include a first sub-protruding portion EP-S1a having a square pillar shape, a second sub-protruding portion EP-S2a disposed between the first base portion BL1-a and the first sub-protruding portion EP-S1a, and a third sub-protruding portion EP-S3a disposed on the first sub-protruding portion EP-S1a.

The second sub-protruding portion EP-S2a may have a truncated square pyramid shape in which an area of a bottom surface adjacent to the first base portion BL1-a is greater than an area of a upper surface adjacent to the first sub-protruding portion EP-S1a. In addition, the third sub-protruding portion EP-S3a may have a truncated square pyramid shape in which an area of a bottom surface adjacent to the first sub-protruding portion EP-S1a is greater than an area of a upper surface spaced apart from the first sub-protruding portion EP-S1a.

Referring to FIG. 10, the second pattern layer RP2-a may include a plurality of cavities HP defined in one surface DS2-a. The first protruding portions EP1-a of the first pattern layer RP1-a may be arranged to correspond to the cavities HP of the second pattern layer RP2-a in a one-to-one correspondence. The first protruding portions EP1-a of the first pattern layer RP1-a may be arranged to fill the cavities HP of the second pattern layer RP2-a.

In the exemplary embodiment of the optical film OF-a shown in FIGS. 8 to 10, the first pattern layer RP1-a may have a refractive index smaller than a refractive index of the second pattern layer RP2-a. In an exemplary embodiment, a difference in refractive index between the first pattern layer RP1-a and the second pattern layer RP2-a may be equal to or greater than about 0.2, for example.

The first protruding portions EP1-a may be arranged in rows in the direction corresponding to the second directional axis DR2. A spacing interval $W_{P1-a}$ in the direction corresponding to the first directional axis DR1 between the first protruding portions EP1-a arranged in a first row L1 and the first protruding portions EP1-a arranged in a second row L2 adjacent to the first row L1 may be in a range from about 12 micrometers to about 16 micrometers, for example. A width $W_{1-a}$ in the direction corresponding to the first directional axis DR1 of each first protruding portion EP1-a may be in a range from about 3 micrometers to about 5 micrometers, for example.

The spacing interval $W_{P1-a}$ between the first protruding portions adjacent to each other in a cross-section of the first protruding portions EP1-a perpendicular to the first base portion BL1-a and the width $W_{1-a}$ of each first sub-protruding portion EP-S1a may have the relationship represented by the following Equation 1-a.

$$0.15 \leq W_{1-a}/W_{P1-a} \leq 0.45 \qquad \text{Equation 1-a}$$

In Equation 1-a, the spacing interval $W_{P1-a}$ between the first protruding portions EP1-a may be obtained by adding the width $W_{1-a}$ of each first sub-protruding portion EP-S1a and a minimum spacing interval $W_{2-a}$ between the rows in which the first protruding portions EP1-a are arranged in the direction corresponding to the second directional axis DR2. Referring to FIG. 9, the spacing interval $W_{P1-a}$ between the first protruding portions EP1-a adjacent to each other may be a distance between the first protruding portions EP1-a arranged in the rows L1 and L2 adjacent to each other. The rows L1 and L2 is a virtual lines in which the first protruding portions EP1-a are aligned in the direction of the second directional axis DR2.

When viewed in a cross-section perpendicular to the first base portion BL1-a, the spacing interval $W_{P1-a}$ in the direction corresponding to the first directional axis DR1 between the first protruding portions EP1-a arranged in the first row L1 and the first protruding portions EP1-a arranged in the second row L2 and the height $H_{1-a}$ of each first protruding portion EP1-a may have the relationship represented by the following Equation 2-a.

$$0.75 \leq H_{1-a}/W_{P1-a} \leq 1.35 \qquad \text{Equation 2-a}$$

As represented by Equation 1-a described above, in Equation 2-a, the spacing interval $W_{P1-a}$ may be obtained by adding the width $W_{1-a}$ of each first sub-protruding portion EP-S1a and the minimum spacing interval $W_{2-a}$ between the rows in which the first protruding portions EP1-a are arranged in the direction corresponding to the second directional axis DR2. In addition, the height $H_{1-a}$ of the first protruding portion EP1-a corresponds to a height in the direction corresponding to the third directional axis DR3 that is the thickness direction of the optical film OF-a. The height $H_{1-a}$ of the first protruding portion EP1-a may be in a range from about 12 micrometers to about 16 micrometers, for example.

The descriptions about the relationship between the width and the height of the first, second, and third sub-protruding portions EP-S, EP-S2, and EP-S3 may be applied equally to the relationship between the width and the height of the first, second, and third sub-protruding portions EP-S1a, EP-S2a, and EP-S3a in a cross-section.

In the case where the optical film OF-a described with reference to FIGS. 8 to 10 is included in the display device DD described with reference to FIGS. 1 to 3, the display device DD may have improved front brightness characteristics and superior viewing angle characteristics as in the case where the display device DD includes the optical film OF described with reference to FIGS. 5 to 7C.

The display device in the exemplary embodiment may include the liquid crystal display panel and the optical film disposed on the liquid crystal display panel.

FIG. 3 shows a cross-sectional view of the exemplary embodiment of the display device DD, and the display device DD may include the optical films OF and OF-a described with reference to FIGS. 5 to 10. That is, the descriptions described with reference to FIGS. 5 to 10 may be applied equally to the optical film OF included in the display device DD in the exemplary embodiment.

In the display device DD shown in FIG. 3, the first pattern layer RP1 of the optical film OF may be disposed more adjacent to the liquid crystal display panel DP than the second pattern layer RP2 is to the liquid crystal display panel DP The refractive index of the first pattern layer RP1 may be smaller than the refractive index of the second pattern layer RP2.

In an exemplary embodiment, in the optical film OF included in the display device DD shown in FIG. 3, the refractive index of the first pattern layer RP1 may be smaller than the refractive index of the second pattern layer RP2, and the difference in refractive index between the second pattern layer RP2 and the first pattern layer RP1 may be equal to or greater than 0.2, for example. The refractive index of the first pattern layer RP1 may be in a range from about 1.0 to about 1.5, and the refractive index of the second pattern layer RP2 may be in a range from about 1.2 to about 1.7. In an exemplary embodiment, the refractive index of the second pattern layer RP2 may be equal to or less than about 1.6, the refractive index of the first pattern layer RP1 may be equal to or less than about 1.4, and the refractive index of the second pattern layer RP2 may be greater than the refractive index of the first pattern layer RP1 by a range from about 0.2 or more, for example.

The display device DD including the optical film OF in the exemplary embodiment may exhibit excellent visibility. That is, the display device DD including the optical film OF in the exemplary embodiment may have superior display quality since an emission amount of the white light in a front direction increases, a contrast ratio increases, and a gamma distortion index ("GDI") value in the side view angle direction at an angle of about 60 degrees is also improved.

TABLE 1

|  | Comparative example | Embodiment example |
|---|---|---|
| White light brightness | 300 | 353 |
| Contrast ratio | 4459 | 5810 |
| GDI at 60 degrees | 0.270 | 0.150 |

Table 1 shows display quality characteristics in an Embodiment example including the optical film in the exemplary embodiment described with reference to FIGS. 5 to 7C in the exemplary embodiment having the structure of the display device DD in the exemplary embodiment shown in FIG. 3 and display quality characteristics in a Comparative example in which a first protruding portion of an optical film has a trapezoid shape. In the case of the Comparative example, a cross-section of the first protruding portion of the optical film has a trapezoid shape, and a side surface of the first protruding portion of the optical film has an inclination angle of about 80 degrees with respect to a bottom surface of the optical film. Table 1 shows results obtained by comparing the white light brightness, the contrast ratio, and the GDI value in the front direction of the Comparative example with those of the Embodiment example under the same conditions except that the optical films have different shapes from each other.

Referring to the results in Table 1, the white light brightness in the front direction of the Embodiment example was increased and the GDI value was improved as compared with the Comparative example. In addition, the contrast ratio was maintained at a level similar to that of the Comparative example. That is, in the case where the display device includes the optical film having the structure described with reference to FIGS. 5 to 7C, the display quality in the front and side directions in the Embodiment example was improved as compared with the Comparative example.

Table 2 shows, in the case where the first sub-protruding portion EP-S1 has the width W1 of about 4 micrometers and the spacing interval $W_{P1}$ between the first sub-protruding portions EP-S adjacent to each other is about 12 micrometers in the display device DD in the exemplary embodiment shown in FIG. 3, compared results of the GDI value and the contrast ratio depending on variations in the width and the height of the second sub-protruding portion EP-S2 and the third sub-protruding portion EP-S3 and variations in inclination angle of the side surfaces of the second and third sub-protruding portions in a cross-section.

Table 2 shows the compared results of the GDI value and the contrast ratio between a combination of the height $H_{S2}$, the width $W_{A2}$, and the inclination angle $\theta_{S2}$ in the cross-section of the side surface protruding portion EP-AD disposed at one side of the second sub-protruding portion EP-S2 and a combination of the height $H_{S3}$, the width $W_{O2}$, and the inclination angle $\theta_{S3}$ in the cross-section of the chamfered portion EP-OP defined in one side of the third sub-protruding portion EP-S3. In the exemplary embodiment shown in Table 2, the difference in refractive index between the first pattern layer and the second pattern layer is about 0.23.

TABLE 2

|  |  |  | Side surface protruding portion $[H_{S2}(\mu m)/W_{A2}(\mu m)/\Theta_{S2}(°)]$ | | | |
|---|---|---|---|---|---|---|
|  |  |  | 1/0.25/76 | 2/0.25/83 | 2/0.5/76 | 2/0.75/69 |
| GDI | Chamfered Portion $[H_{S3}(\mu m)/W_{O2}(\mu m)/\Theta_{S3}(°)]$ | 1/0.25/76 | 0.147 | 0.149 | 0.142 | 0.132 |
|  |  | 2/0.25/83 | 0.153 | 0.150 | 0.144 | 0.134 |
|  |  | 2/0.50/76 | 0.133 | 0.134 | 0.121 | 0.113 |
| Front CR | Chamfered Portion $[H_{S3}(\mu m)/W_{O2}(\mu m)/\Theta_{S3}(°)]$ | 1/0.25/76 | 3526 | 3772 | 2885 | 2917 |
|  |  | 2/0.25/83 | 3794 | 4059 | 3093 | 3154 |
|  |  | 2/0.50/76 | 3075 | 2889 | 2355 | 2408 |

Referring to the results of Table 2, in a combination of a case in which the side surface protruding portion EP-AD of the second sub-protruding portion EP-S2 has the height $H_{S2}$ from about 1 micrometers to about 2 micrometers and the width $W_{A2}$ from about 0.25 micrometers to about 0.75 micrometers and the second sub-side surface SS-S2 has the inclination angle $\theta_{S2}$ from about 69 degrees to about 83 degrees and a case in which the chamfered portion EP-OP of the third sub-protruding portion EP-S3 has the height $H_{S3}$ from about 1 micrometers to about 2 micrometers and the width $W_{O2}$ from about 0.25 micrometers to about 0.50 micrometers and the third sub-side surface SS-S3 has the inclination angle $\theta_{S3}$ from about 76 degrees to about 83 degrees, the GDI value was represented at a low value of about 0.15. That is, the optical film in the exemplary embodiment may be used for the improvement of the side viewing angle characteristics of the display device.

The front CR value shown in Table 2 was adjusted by the combination of the shape of the side surface protruding portion EP-AD of the second sub-protruding portion EP-S2 and the shape of the chamfered portion EP-OP of the third sub-protruding portion EP-S3. In an exemplary embodiment, the superior front contrast ratio was obtained in the combination of the case in which the height $H_{S2}$, the width $W_{A2}$, and the side surface inclination angle $\theta_{S2}$ in the cross-section of the side surface protruding portion EP-AD are from about 1 micrometers to about 2 micrometers, about 0.25 micrometers, and from about 76 degrees to about 83 degrees, respectively, and the case in which the height $H_{S3}$, the width $W_{O2}$, and the side surface inclination angle $\theta_{S3}$ in the cross-section of the chamfered portion EP-OP are about 2 micrometers, about 0.25 micrometers, and about 83 degrees, respectively, for example.

The superior visibility of the display device was obtained when the optical film includes the pattern layer including the first protruding portions, a ratio of the width $W_1$ of each first sub-protruding portion to the spacing interval $W_{P1}$ between the first protruding portions adjacent to each other is in a range from about 0.15 to about 0.45, and a ratio of the height $H_1$ of each first sub-protruding portion to the spacing interval $W_{P1}$ between the first protruding portions adjacent to each other is in a range from about 0.75 to about 1.35. In addition, the excellent visibility was exhibited in the side viewing angle by the optical film including the sub-protruding portions satisfying the Equations 3 to 6 described above.

Figure 11:
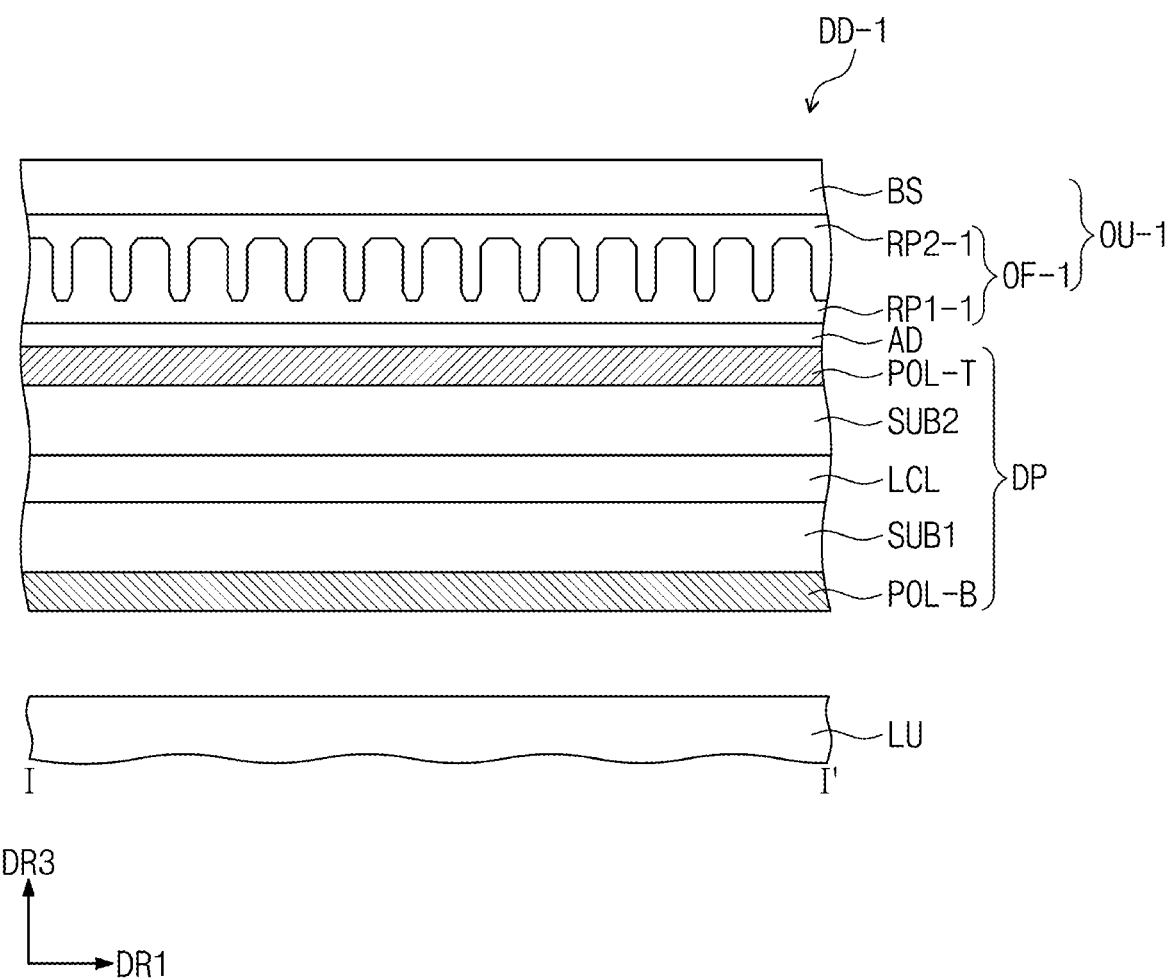
FIG. 11 is a cross-sectional view showing an exemplary embodiment of a display device according to the invention.
Figure 12A:
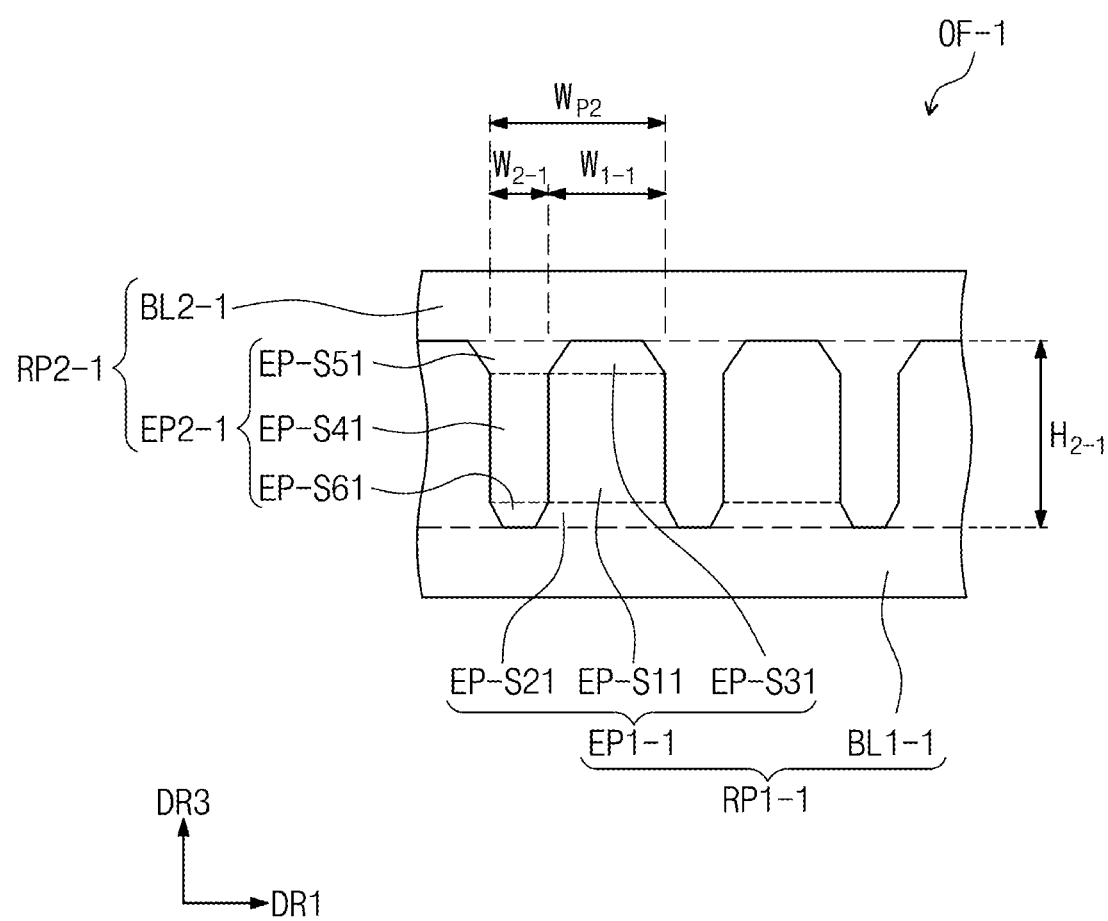
FIG. 12A is a cross-sectional view showing an exemplary embodiment of a portion of an optical film according to the invention.
Figure 12B:
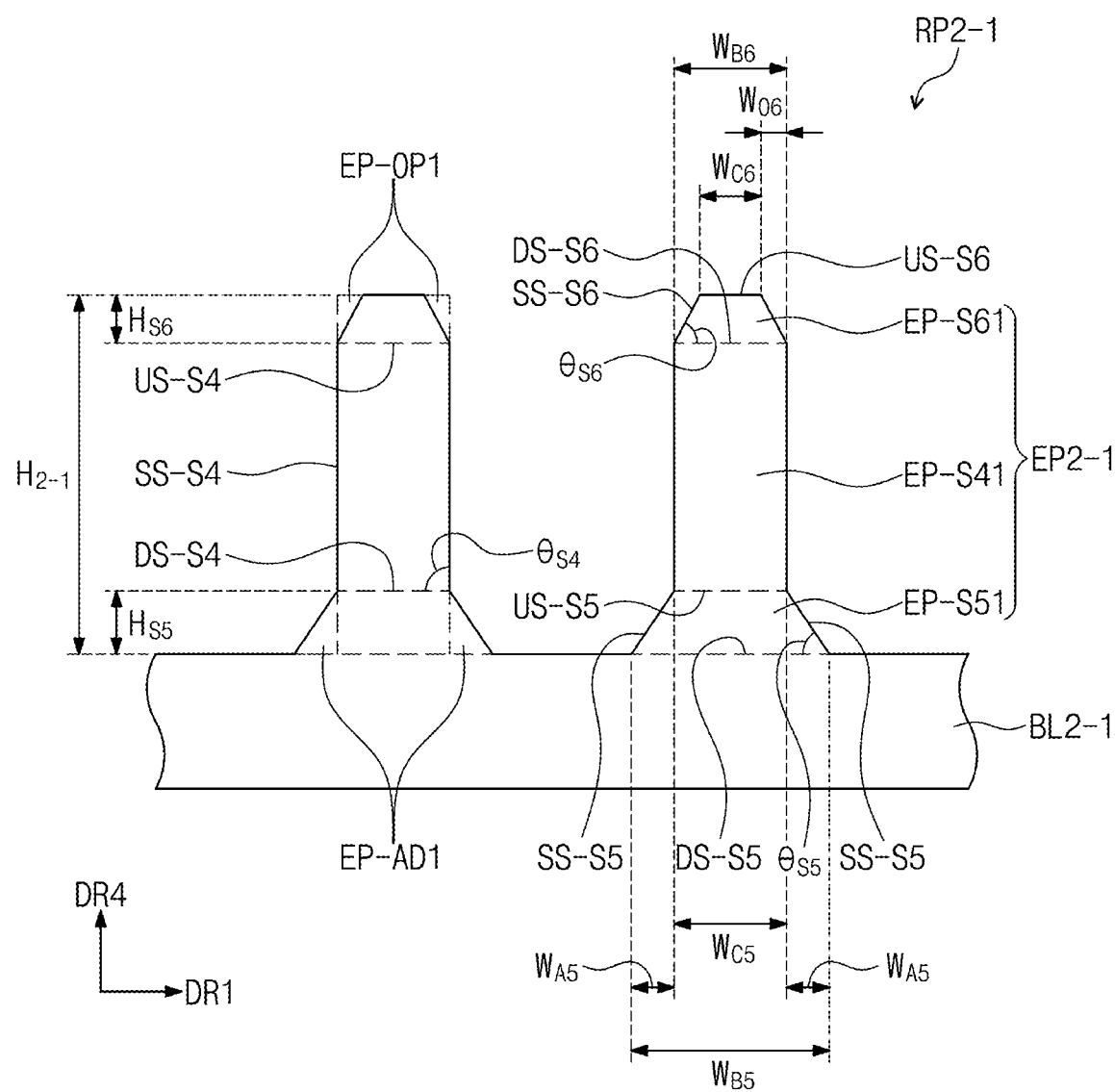
FIG. 12B is a cross-sectional view showing an exemplary embodiment of a portion of an optical film according to the invention.

FIG. 11 is a cross-sectional view showing an exemplary embodiment of a display device DD-1 according to the invention. FIGS. 12A and 12B are cross-sectional views showing an exemplary embodiment of an optical film OF-1 included in the display device DD-1 of FIG. 11. FIG. 12A shows a cross-section of the optical film OF-1 in a plane defined by the first directional axis DR1 and the third directional axis DR3, and FIG. 12B shows a cross-section of a second pattern layer RP2-1 in a plane defined by the first directional axis DR1 and the fourth directional axis DR4.

Hereinafter, the same descriptions of the display device DD-1 and the optical film OF-1 shown in FIGS. 11, 12A, and 12B as those described with reference to FIGS. 1 to 10 will be omitted, and thus different features will be mainly described.

The display device DD-1 of the exemplary embodiment shown in FIG. 11 differs from the display device DD of the exemplary embodiment shown in FIG. 3 in the combination of the first pattern layer RP1-1 and the second pattern layer RP2-1 in the optical film OF-1 of the optical member OU-1.

In the exemplary embodiment of the optical film OF-1, the second pattern layer RP2-1 may be disposed on the first pattern layer RP1-1, and the first pattern layer RP1-1 may have a refractive index larger than a refractive index of the second pattern layer RP2-1. That is, the display device DD-1 may include the optical film OF-1 in which the pattern layer having a relatively large refractive index is disposed adjacent to the liquid crystal display panel DP.

In an exemplary embodiment, in the optical film OF-1 included in the display device DD-1 shown in FIG. 11, the refractive index of the first pattern layer RP1-1 is larger than the refractive index of the second pattern layer RP2-1, and a difference in refractive index between the first pattern layer RP1-1 and the second pattern layer RP2-1 may be equal to or greater than about 0.2, for example. The refractive index of the first pattern layer RP1-1 may be in a range from about 1.2 to about 1.7, and the refractive index of the second pattern layer RP2-1 may be in a range from about 1.0 to about 1.5. In an exemplary embodiment, the refractive index of the first pattern layer RP1-1 may be equal to or less than about 1.6, the refractive index of the second pattern layer RP2-1 may be equal to or less than about 1.4, and the refractive index of the first pattern layer RP1-1 may be greater than the refractive index of the second pattern layer RP2-1 by a range from about 0.2 to about 0.25, for example.

In the exemplary embodiment, a first protruding portion EP1-1 included in the first pattern layer RP1-1 may include a first sub-protruding portion EP-S11, a second sub-protruding portion EP-S21, and a third sub-protruding portion EP-S31, and a second protruding portion EP2-1 included in the second pattern layer RP2-1 may include a fourth sub-protruding portion EP-S41, a fifth sub-protruding portion EP-S51, and a sixth sub-protruding portion EP-S61.

In the optical film OF-1 included in the display device DD-1 shown in FIG. 11, a spacing interval $W_2$ between the second protruding portions EP2-1 adjacent to each other in the cross-section perpendicular to a second base portion BL2-1 and a width $W_{2-1}$ of the fourth sub-protruding portion EP-S41 may have the relationship represented by the following Equation 1-1.

$0.15 \leq W_{2-1}/W_{P2} \leq 0.45$  Equation 1-1

In Equation 1-1, the spacing interval $W_{P2}$ is obtained by adding the width $W_{2-1}$ of the fourth sub-protruding portions EP-S41 and a minimum spacing interval $W_{1-1}$ between the fourth sub-protruding portions EP-S41 of the second protruding portions EP2-1 adjacent to each other, and $W_{1-1}$ and $W_{2-1}$ correspond to distances in a direction perpendicular to an extension direction of the second protruding portions EP2-1. Referring to FIG. 12A, the spacing interval $W_2$ between the second protruding portions EP2-1 adjacent to each other and the width $W_{2-1}$ of the fourth sub-protruding portions EP-S41 may indicate distances in a direction substantially parallel to the first directional axis DR1.

In an exemplary embodiment, the width $W_{2-1}$ of each of the fourth sub-protruding portions EP-S41 may be within a range from about 3 micrometers to about 5 micrometers, for example. In addition, the spacing interval $W_2$ between the second protruding portions EP2-1 may be within a range from about 12 micrometers to about 16 micrometers, for example.

The spacing interval $W_{P2}$ between the second protruding portions EP2-1 adjacent to each other in the cross-section of the second protruding portions EP2-1 perpendicular to the second base portion BL2-1 and a height $H_{2-1}$ of each of the second protruding portions EP2-1 may have the relationship represented by the following Equation 2-1.

$0.75 \leq H_{2-1}/W_{P2} \leq 1.35$  Equation 2-1

In Equation 2-1, as described in Equation 1-1, the spacing interval $W_2$ is obtained by adding the width $W_{2-1}$ of the fourth sub-protruding portion EP-S41 and the minimum spacing interval $W_{1-1}$ between the fourth sub-protruding portions EP-S41 adjacent to each other, and $W_{2-1}$ and $W_{1-1}$ correspond to the distances in the direction perpendicular to the extension direction of the second protruding portions EP2-1. The height $H_{2-1}$ of the second protruding portion EP2-1 corresponds to a height in the direction corresponding to the third directional axis DR3 that is the thickness direction of the optical film OF-1.

In an exemplary embodiment, the spacing interval $W_{P2}$ between the second protruding portions EP2-1 may be within a range from about 12 micrometers to about 16 micrometers, and the height $H_{2-1}$ of the second protruding portions EP2-1 may be within a range from about 12 micrometers to about 16 micrometers, for example.

Referring to FIGS. 11 to 12B, the fourth sub-protruding portion EP-S41 may have a second width $W_{2-1}$ in the cross-section perpendicular to the second base portion BL2-1. The fourth sub-protruding portion EP-S41 may include a fourth sub-bottom surface DS-S4 adjacent to the second base portion BL2-1, a fourth sub-upper surface US-S4 facing the fourth sub-bottom surface DS-S4, and a fourth sub-side surface SS-S4 connecting the fourth sub-bottom surface DS-S4 and the fourth sub-upper surface US-S4.

The fifth sub-protruding portion EP-S51 may have a width that gradually increases from the fourth sub-protruding portion EP-S41 toward the second base portion BL2-1. The fifth sub-protruding portion EP-S51 may include a fifth sub-bottom surface DS-S5 adjacent to the second base portion BL2-1, a fifth sub-upper surface US-S5 facing the fifth sub-bottom surface DS-S5, and a fifth sub-side surface SS-S5 connecting the fifth sub-bottom surface DS-S5 and the fifth sub-upper surface US-S5.

The sixth sub-protruding portion EP-S61 may be disposed between a first base portion BL1-1 and the fourth sub-protruding portion EP-S41 and may have a width that gradually decreases as a distance from the fourth sub-protruding portion EP-S41 increases. The sixth sub-protruding portion EP-S61 may include a sixth sub-bottom surface DS-S6 adjacent to the fourth sub-protruding portion EP-S41, a sixth sub-upper surface US-S6 facing the sixth sub-bottom surface DS-S6, and a sixth sub-side surface SS-S6 connecting the sixth sub-bottom surface DS-S6 and the sixth sub-upper surface US-S6.

According to the display device DD-1, the fifth sub-protruding portion EP-S51 may have a trapezoid shape, and the fifth sub-side surface SS-S5 may have an inclination angle θs5 in a range from about 69 degrees to about 83 degrees with respect to the fifth sub-bottom surface DS-S5 of the fifth sub-protruding portion EP-S51.

In addition, a width of the fifth sub-bottom surface DS-S5 of the fifth sub-protruding portion EP-S51 in the exemplary embodiment may be greater than a width of the fifth sub-upper surface US-S5. The width of the fifth sub-bottom surface DS-S5 may be obtained by adding the width of the fifth sub-upper surface US-S5 and a width of a side surface protruding portion EP-AD1. The width of the fifth sub-upper surface US-S5 may be substantially the same as the width of the fourth sub-bottom surface DS-S4 of the fourth sub-protruding portion EP-S41. In addition, when assuming that a maximum width of the fifth sub-bottom surface DS-S5 is "$W_{B5}$" and a maximum width of the fifth sub-upper surface US-S5 is "$W_{C5}$", the maximum width $W_{B5}$ of the fifth sub-bottom surface DS-S5 and the maximum width $W_{C5}$ of the fifth sub-upper surface US-S5 may satisfy the following Equation 3-1.

$$0.67 \leq W_{C5}/W_{B5} \leq 0.91 \qquad \text{Equation 3-1}$$

The maximum width $W_{B5}$ of the fifth sub-bottom surface DS-S5 and the maximum width $W_{C5}$ of the fifth sub-upper surface US-S5 correspond to widths in the direction corresponding to the first directional axis DR1.

In the exemplary embodiment, the width $W_{B5}$ of the fifth sub-bottom surface DS-S5 may be greater than the width $W_{C5}$ of the fifth sub-upper surface US-S5, the maximum width $W_{B5}$ of the fifth sub-bottom surface DS-S5 may be within a range from about 3.5 micrometers to about 6.5 micrometers, and the maximum width $W_{C5}$ of the fifth sub-upper surface US-S5 may be within a range from about 3 micrometers to about 5 micrometers, for example.

Further, the cross-section of the second protruding portion EP2-1 of the optical film OF-1 may have a shape satisfying the following Equation 4-1.

$$0.06 \leq H_{S5}/H_{2-1} \leq 0.17 \qquad \text{Equation 4-1}$$

In Equation 4-1, $H_{2-1}$ denotes a maximum height in the thickness direction of the second protruding portion EP2-1 in the cross-section of the second protruding portion EP2-1 perpendicular to the second base portion BL2-1, and $H_{S5}$ denotes a maximum height in the thickness direction of the fifth sub-protruding portion EP-S51 in the cross-section. The maximum height $H_{2-1}$ in the thickness direction of the second protruding portion EP2-1 and the maximum height $H_{S5}$ in the thickness direction of the fifth sub-protruding portion EP-S51 correspond to heights in the direction corresponding to the fourth directional axis DR4.

The height $H_{S5}$ in the thickness direction of the fifth sub-protruding portion EP-S51 may be within a range from about 1 micrometers to about 2 micrometers, for example. In addition, the maximum height $H_{2-1}$ in the thickness direction of the second protruding portion EP2-1 may be within a range from about 12 micrometers to about 16 micrometers, for example.

In the exemplary embodiment, the sixth sub-protruding portion EP-S61 may have a trapezoid shape, and the sixth sub-side surface SS-S6 may have an inclination angle θ6 in a range from about 69 degrees to about 83 degrees with respect to the sixth sub-bottom surface DS-S6 of the sixth sub-protruding portion EP-S61.

In addition, a width of the sixth sub-bottom surface DS-S6 of the sixth sub-protruding portion EP-S61 of the display device DD-1 in the exemplary embodiment may be greater than a width of the sixth sub-upper surface US-S6. The width of the sixth sub-bottom surface DS-S6 may be obtained by adding the width of the sixth sub-upper surface US-S6 and widths of a chamfered portion EP-OP1. The width of the sixth sub-bottom surface DS-S6 may be substantially the same as the width of the fourth sub-upper surface US-S4 of the fourth sub-protruding portion EP-S4. In addition, when assuming that a maximum width of the sixth sub-bottom surface DS-S6 is "$W_{B6}$" and a maximum width of the sixth sub-upper surface US-S6 is "$W_{C6}$", "$W_{B6}$" and "$W_{C6}$" may satisfy the following Equation 5-1.

$$0.67 \leq W_{C6}/W_{B6} \leq 0.90 \qquad \text{Equation 5-1}$$

The maximum width $W_{B6}$ of the sixth sub-bottom surface DS-S6 and the maximum width $W_{C6}$ of the sixth sub-upper surface US-S6 correspond to widths in the direction corresponding to the first directional axis DR1.

In the exemplary embodiment, the width $W_{B6}$ of the sixth sub-bottom surface DS-S6 may be greater than the width $W_{C6}$ of the sixth sub-upper surface US-S6, the maximum width $W_{B6}$ of the sixth sub-bottom surface DS-S6 may be within a range from about 3 micrometers to about 5 micrometers, and the maximum width $W_{C6}$ of the sixth sub-upper surface US-S6 may be within a range from about 2 micrometers to about 4.5 micrometers, for example.

Further, the cross-section of the second protruding portion EP2-1 may have a shape satisfying the following Equation 6-1.

$$0.06 \leq H_{S6}/H_{2-1} \leq 0.17 \qquad \text{Equation 6-1}$$

In Equation 6-1, $H_{2-1}$ denotes the maximum height in the thickness direction of the second protruding portion EP2-1 in the cross-section of the second protruding portion EP2-1 perpendicular to the second base portion BL2-1, and $H_{S6}$ denotes a maximum height in the thickness direction of the sixth sub-protruding portion EP-S61 in the cross-section. The maximum height $H_{2-1}$ in the thickness direction of the second protruding portion EP2-1 and the maximum height $H_{S6}$ in the thickness direction of the sixth sub-protruding portion EP-S61 correspond to heights in the direction corresponding to the fourth directional axis DR4.

The height $H_{S6}$ in the thickness direction of the sixth sub-protruding portion EP-S61 may be within a range from about 1 micrometers to about 2 micrometers, for example. In addition, the maximum height $H_{2-1}$ in the thickness direction of the second protruding portion EP2-1 may be within a range from about 12 micrometers to about 16 micrometers, for example.

When the optical film included in the display device in the exemplary embodiment includes the second pattern layer including the second protruding portions and the first pattern layer having the refractive index higher than that of the second pattern layer and each of the second protruding portions satisfies the relationships represented by Equations 1-1 to 6-1, frontal characteristics and side viewing angle characteristics of the display device may be improved.

In the optical film OF-1 in the exemplary embodiment described with reference to FIGS. 11, 12A, and 12B, the fourth sub-side surface SS-S4 of the fourth sub-protruding portions EP-S41 may be substantially perpendicular to the fourth sub-bottom surface DS-S4, and the second protruding portions EP2-1 of the second pattern layer RP2-1 having the refractive index lower than that of the first pattern layer RP1-1 may satisfy the Equations 1-1 to 6-1. The display device DD-1 including the optical film OF-1 in the exemplary embodiment may exhibit excellent visibility. That is, the display device DD-1 including the optical film OF-1 in the exemplary embodiment may exhibit excellent display quality since an emission amount of the white light in the front direction increases and the GDI value in the side viewing angle direction at about 60 degrees is also improved.

Figure 13A:
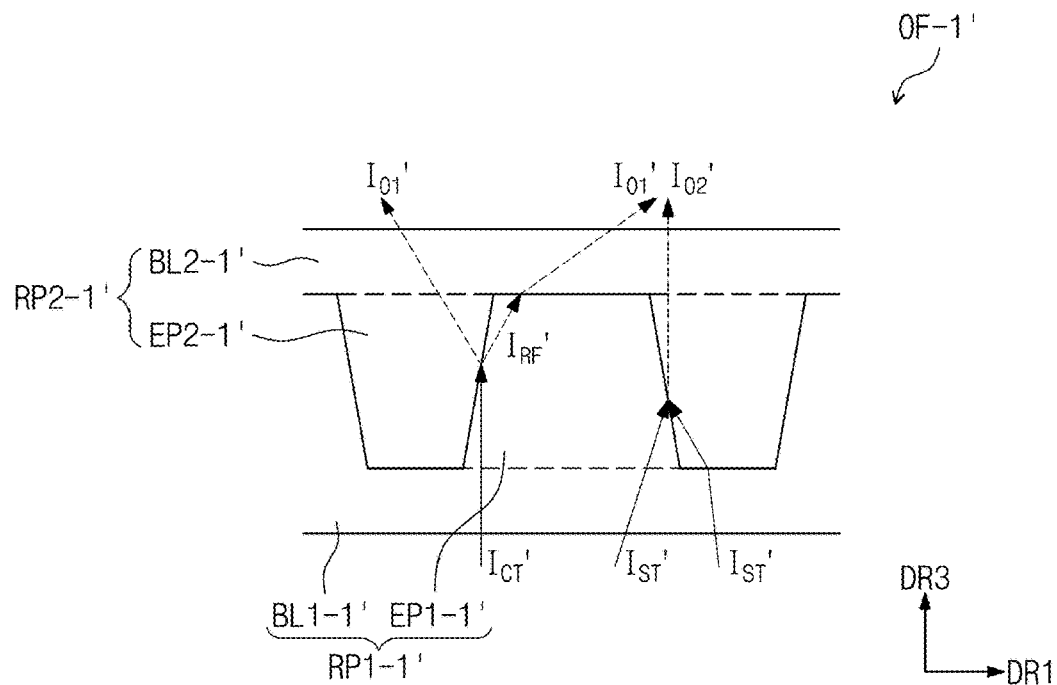
FIGS. 13A and 13B are views respectively showing a light path in a comparative example and an embodiment example of an optical film.

FIG. 13A is a view showing a light path in an optical film OF-1' in which a first protruding portion EP1-1' has a trapezoid shape in its cross-section as compared with the optical film OF-1 shown in FIGS. 12A and 12B. A side surface of the first protruding portion EP1-1' has an inclination angle from about 80 degrees to about 85 degrees in a cross-section in FIG. 13A. When a light $I_{CT}'$ is incident into the optical film OF-1' of FIG. 13A in the front direction, the incident light $I_{CT}'$ is reflected or refracted at a boundary between a first pattern layer RP1-1' and a second pattern layer RP2-1' and provided to the second pattern layer RP2-1' including a second base portion BL2-1' and a second protruding portion EP2-1'. The light provided to the second pattern layer RP2-1' as a reflection light $I_{RF}'$ reflected from the boundary between the first pattern layer RP1-1' and the second pattern layer RP2-1' is tilted in a lateral direction to be emitted as a side light $I_{O1}'$. In addition, the light refracted at the boundary between the first pattern layer RP1-1' and the second pattern layer RP2-1' transmits through the second pattern layer RP2-1' to be emitted as the side light $I_{O1}'$ that is tilted in the lateral direction. That is, when the optical film OF-1' including the first protruding portion EP1-1' having the trapezoid shape in the cross-section is used, the light $I_{CT}'$ incident in the front direction is emitted as the side light $I_{O1}'$, and thus the amount of white light is reduced in the front direction.

In addition, a light $I_{ST}'$ incident into the side surface is reflected or refracted at an inclined surface of the first protruding portion EP1-1' having the trapezoid shape in its cross-section to be emitted as a front light $I_{O2}'$. Accordingly, the emission amount of the light in the front direction increases in a black state, and thus the contrast ratio decreases.

Figure 13B:
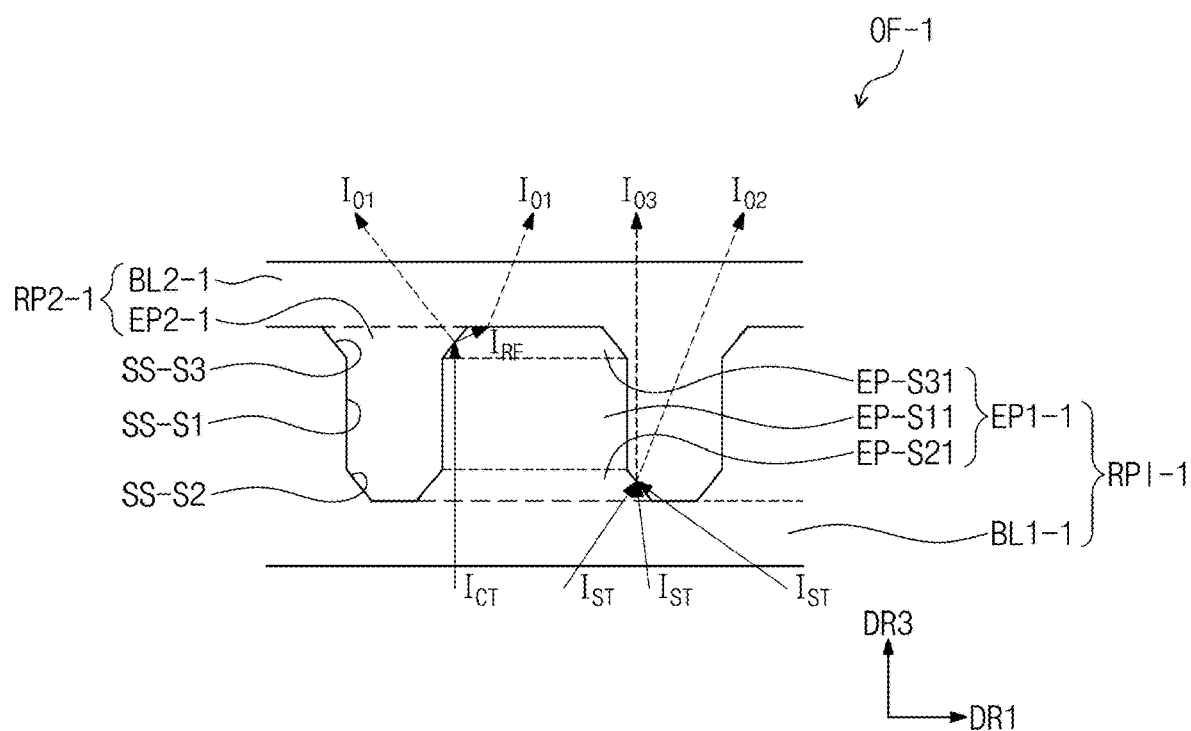

As shown in FIG. 13B, in the exemplary embodiment of the optical film OF-1, the side surface of the first protruding portion EP1-1 may include the first sub-side surface SS-S1 disposed perpendicular to the bottom surface, the second sub-side surface SS-S2 that is the inclined surface disposed adjacent to the first base portion BL1-1, and the third sub-side surface SS-S3 that is the inclined surface disposed adjacent to the second base portion BL2-1. A light $I_{CT}$ incident into the first protruding portion EP1-1 in the front direction is not reflected by the first sub-side surface SS-S1 of the first protruding portion EP1-1, is reflected or refracted at the third sub-side surface SS-S3 to be incident into the second pattern layer RP2-1, and transmits through the second pattern layer RP2-1 to be emitted as a refracted light $I_{O1}$. That is, although a direction of the refracted light $I_{O1}$ to be emitted is partially changed in comparison with the light $I_{CT}$ incident in the front direction due to the third sub-side surface SS-S3 that is the inclined surface and the difference in refractive index between the first pattern layer RP1-1 and the second pattern layer RP2-1, a light output angle of the light directed to the side surface may be reduced, or an amount of the light incident in the front surface and output to the side surface may be reduced as compared with the optical film OF-1' in which the entire side surface of the first protruding portion EP1-1' is inclined as shown in FIG. 13A. Therefore, the reduction of the white light in the front direction may be minimized as compared with that of FIG. 13A.

In addition, a light $I_{ST}$ incident into the side surface of the optical film OF-1 shown in FIG. 13B may be refracted at the second sub-side surface SS-S2 and may be exit as a side light $I_{O2}$. That is, since the first protruding portion EP1-1 includes the first sub-protruding portion EP-S11 having the rectangular shape in the cross-section as shown in FIG. 13B, the amount of the light incident into the side surface and exiting through the front surface may be reduced as compared with the optical film OF-1' in which the entire side surface of the first protruding portion EP1-1' corresponds to the inclined surface as shown in FIG. 13A. Thus, the contrast ratio of the display device including the optical film OF-1 shown in FIG. 13B may increase, and the display quality in the side viewing angle of the display device including the optical film OF-1 shown in FIG. 13B may be improved as compared with the display device including the optical film OF-1' shown in FIG. 13A.

The light $I_{ST}$ incident into the side surface in the optical film OF-1 shown in FIG. 13B may be reflected or refracted at the second sub-side surface SS-S2 of the second sub-protruding portion EP-S21 to be incident into the second pattern layer RP2-1 and may transmit through the second pattern layer RP2-1 to be emitted as a front light $I_{O3}$. In this case, since a rate of the second sub-side surface SS-S2 of the first protruding portion EP1-1 of the optical film OF-1 in the exemplary embodiment is relatively small as compared with the optical film OF-1' in which the entire side surface of the first protruding portion EP1-1' corresponds to the inclined surface as shown in FIG. 13A, the amount of the light incident into the side surface direction and reflected or refracted at the second sub-side surface SS-S2 to be emitted as the front light $I_{O3}$ may be reduced more than that of the comparative example. Accordingly, the emission amount of the light emitted in the front direction decreases in the black state as compared with that of FIG. 13A, and thus the contrast ratio increases in the front direction.

Therefore, as compared with the comparative example in which the cross-section of the first protruding portion EP1-1' has the trapezoid shape, in the optical film OF-1 including the first protruding portion EP1-1 according to the embodiment example, the reduction of the white light emitted in the front direction may be minimized, and the proportion of the light emitted in the front direction in the black state may be reduced to increase the contrast ratio of the display device.

In addition, the display quality in the side viewing angle may be improved by the second sub-protruding portion EP-S21 and the third sub-protruding portion EP-S31 provided in a lower end and an upper end of the first protruding portion EP1-1.

Figure 14A:
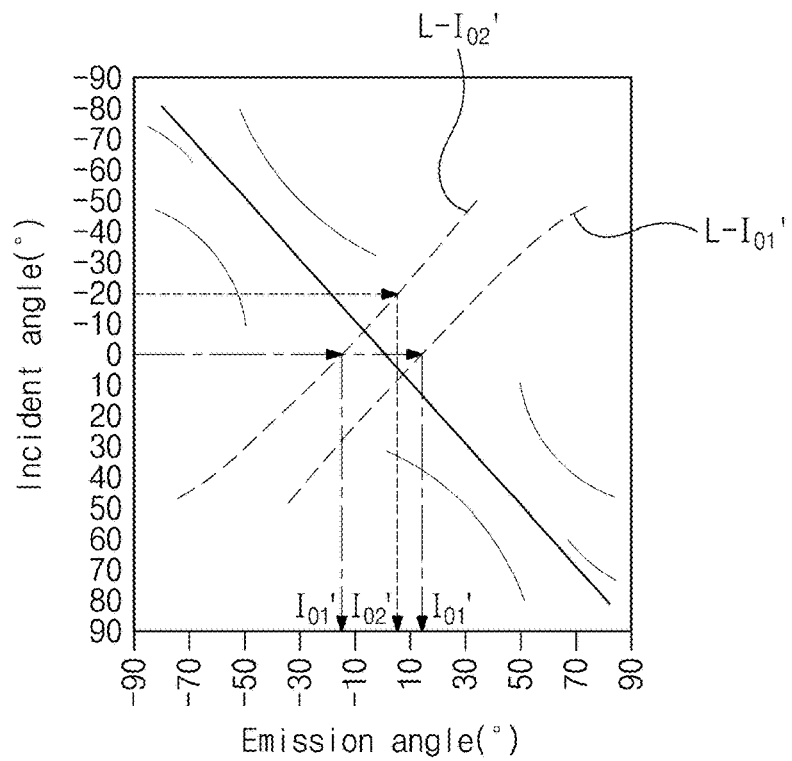
FIG. 14A is a graph showing optical characteristics of a display device including an optical film having a pattern shape of FIG. 13A.

FIG. 14A is a graph showing a relationship between an incident angle of the light and an emission angle of the light in the structure of the optical film OF-1' of the comparative example shown in FIG. 13A. A line indicated by L-$I_{01}$ in FIG. 14A corresponds to the case where the light $I_{CT}$ incident to the front surface is emitted as the side light $I_{01'}$ in FIG. 13A. In addition, a line indicated by L-$I_{02'}$ in FIG. 14A corresponds to the case where the light $I_{ST'}$ incident to the side surface is emitted as the front light $I_{02'}$ in FIG. 13A.

Figure 14B:
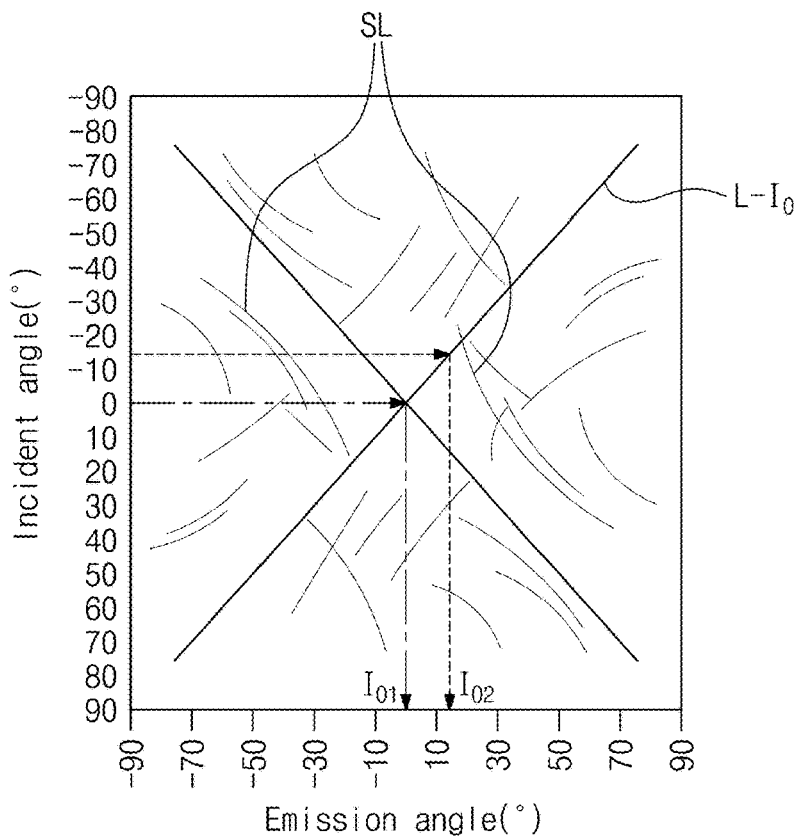
FIG. 14B is a graph showing optical characteristics of a display device including an optical film having a pattern shape of FIG. 13B.

FIG. 14B is a graph showing a relationship between an incident angle of the light and an emission angle of the light in the structure of the optical film OF-1 of the exemplary embodiment shown in FIG. 13B. Referring to FIG. 14B, in the case of the exemplary embodiment of the display device including the optical film OF-1, one emission line L-$I_0$ is observed instead of separated lines like the lines L-$I_{01'}$ and L-$I_{02'}$, as compared with FIG. 14A. That is, the light incident in the front direction is emitted as the front light $I_{01}$, and the light incident in the lateral direction is emitted as the side light $I_{02}$, thereby preventing the display quality in the front direction from deteriorating. In addition, sub-emission lines SL in which the light incident in the front direction is emitted in a range from about 20 degrees to about 50 degrees of the side viewing angle are observed, and thus the display quality in the side viewing angle direction may be improved.

Table 3 shows, in the case where the second protruding portion EP2-1 having a relatively lower refractive index than the first protruding portion EP1-1 has the width $W_{2-1}$ of about 4 micrometers and the spacing interval $W_{P2}$ between the second protruding portions EP2-1 adjacent to each other is about 12 micrometers in the display device DD-1 in the exemplary embodiment shown in FIG. 11, compared results of the GDI value and the contrast ratio depending on variations in the width and the height of the fifth sub-protruding portion EP-S51 and the sixth sub-protruding portion EP-S61 and variations in inclination angle of the side surfaces of the fifth and sixth sub-protruding portions EP-S51 and EP-S61 in a cross-section.

TABLE 3

| | | Side surface protruding portion [$H_{S5}$(μm)/$W_{A5}$(μm)/$\Theta_{S5}$(°)] | |
|---|---|---|---|
| | | 2/0.25/83 | 2/0.5/76 |
| Chamfered portion [$H_{S6}$(μm)/$W_{O6}$(μm)/ $\Theta_{S63}$(°)] | GDI | 2/0.25/83 | 0.186 | 0.139 |
| | Front CR | 2/0.25/83 | 5118 | 2489 |

Referring to the compared result of Table 3, in a combination of a case in which the side surface protruding portion EP-AD1 of the fifth sub-protruding portion EP-S51 has the height $H_{S5}$ from about 1 micrometers to about 2 micrometers, a width $W_{A5}$ from about 0.25 micrometers to about 0.75 micrometers, the inclination angle $\theta_{S5}$ from about 69 degrees to about 83 degrees and a case in which the chamfered portion EP-OP1 of the sixth sub-protruding portion EP-S61 has the height $H_{S6}$ from about 1 micrometers to about 2 micrometers, a width $W_{O6}$ from about 0.25 micrometers to about 0.50 micrometers, and the inclination angle $\theta_{S6}$ from about 76 degrees to about 83 degrees, the GDI value was represented at a low value smaller than about 0.2. That is, the optical film in the exemplary embodiment may be used for the improvement of the side viewing angle characteristics of the display device.

The front CR value shown in Table 3 was adjusted by the combination of the shape of the side surface protruding portion EP-AD1 of the fifth sub-protruding portion EP-S51 and the shape of the chamfered portion EP-OP1 of the sixth sub-protruding portion EP-S61. In an exemplary embodiment, the superior front contrast ratio was obtained in the combination of the case in which the height $H_{S5}$, the width $W_{A5}$, and the inclination angle $\theta_{S5}$ in the cross-section of the side surface protruding portion EP-AD1 are about 2 micrometers, about 0.25 micrometers, and about 83 degrees, respectively, and the case in which the height $H_{S6}$, the width $W_{O6}$, and the inclination angle $\theta_{S6}$ in the cross-section of the chamfered portion EP-OP1 are about 2 micrometers, about 0.25 micrometers, and about 83 degrees, respectively, for example.

The superior visibility of the display device was obtained when the optical film includes the pattern layer including the second protruding portions having the relatively low refractive index, a ratio of the width $W_{2-1}$ of each fourth sub-protruding portion to the spacing interval $W_2$ between the second protruding portions adjacent to each other is in a range from about 0.15 to about 0.45, and a ratio of the height $H_{2-1}$ of each second sub-protruding portion to the spacing interval $W_{P2}$ between the second protruding portions adjacent to each other is in a range from about 0.75 to about 1.35. In addition, the excellent visibility was exhibited in the side viewing angle by the optical film including the sub-protruding portions satisfying the Equations 3-1 to 6-1 described above.

Figure 15:
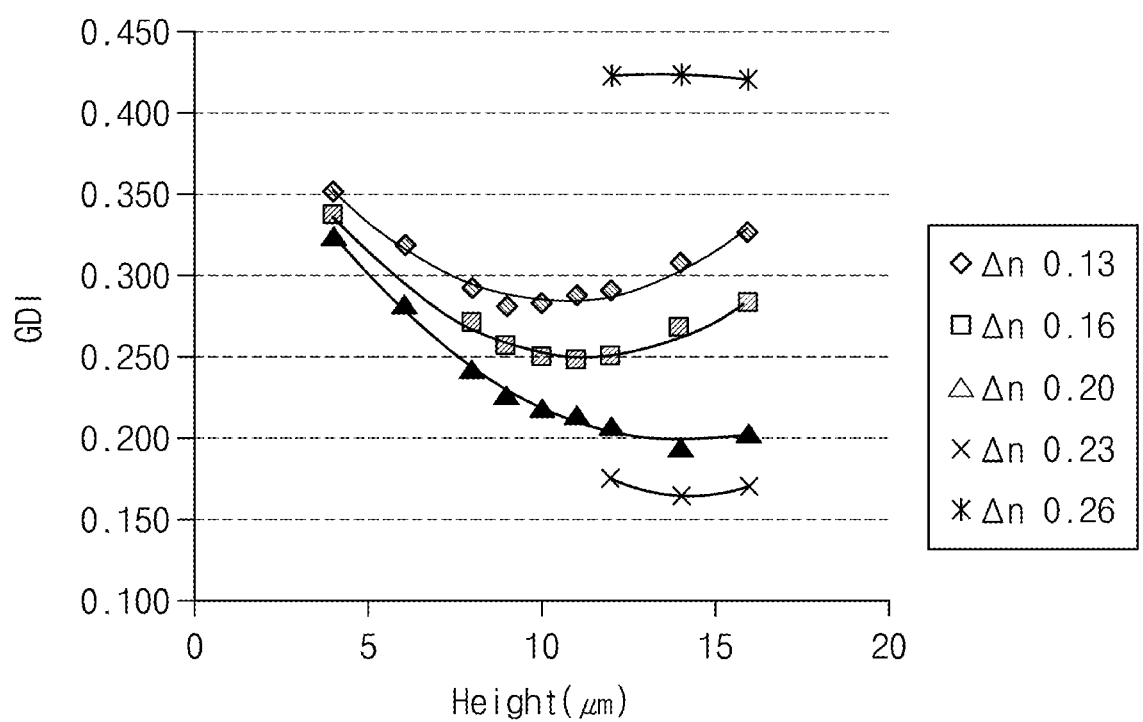
FIG. 15 is a graph showing optical characteristics of a display device as a function of refractive index characteristics of an optical film.

FIG. 15 is a graph showing compared results of the GDI values depending on the difference in refractive index between the first pattern layer RP1-1 and the second pattern layer RP2-1 of the optical film OF-1 included in the display device DD-1. FIG. 15 shows the GDI values depending on the difference in refractive index between the first pattern layer RP1-1 and the second pattern layer RP2-1 and the height of the second protruding portion EP2-1.

Referring to FIG. 15, as the difference in refractive index between the first pattern layer RP1-1 and the second pattern layer RP2-1 increases, the GDI values decrease, and thus the viewing angle characteristics of the display device is improved. In addition, when the difference in refractive index between the first pattern layer RP1-1 and the second pattern layer RP2-1 is in a range from about 0.2 to about 0.25, the visibility of the display device is improved. That is, when the difference in refractive index between the first pattern layer RP1-1 and the second pattern layer RP2-1 is in the range from about 0.2 to about 0.25 and the height of the second protruding portion EP2-1 is in a range from about 12 micrometers to about 16 micrometers, desirable GDI values are obtained.

Figure 16A:
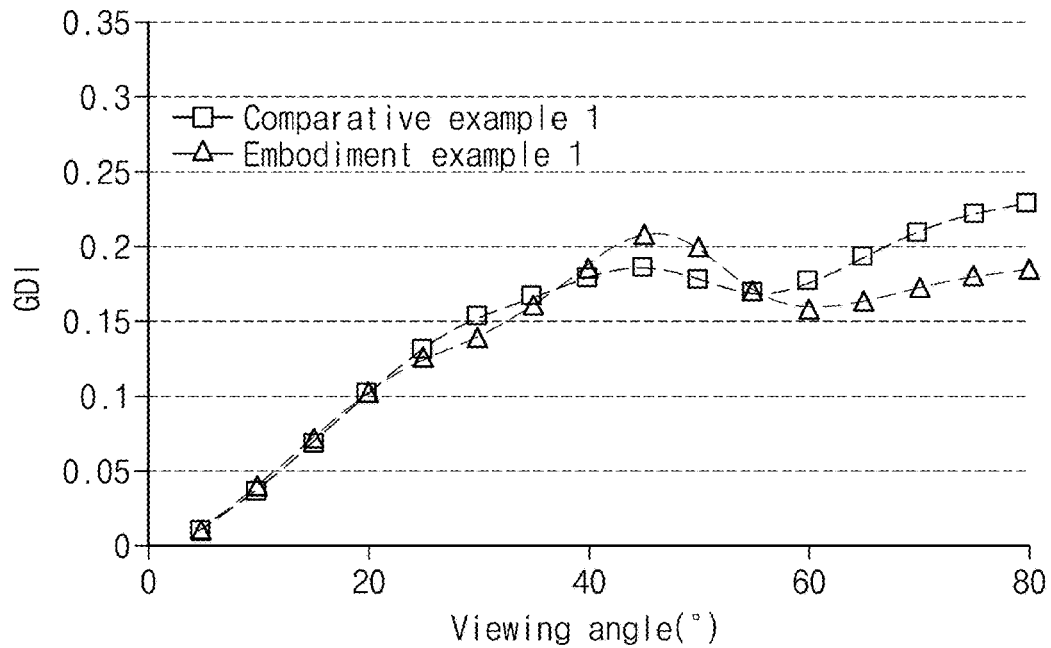
FIGS. 16A and 16B are graphs showing optical characteristics of an exemplary embodiment of a display device according to the invention and optical characteristics of a comparative example.
Figure 16B:
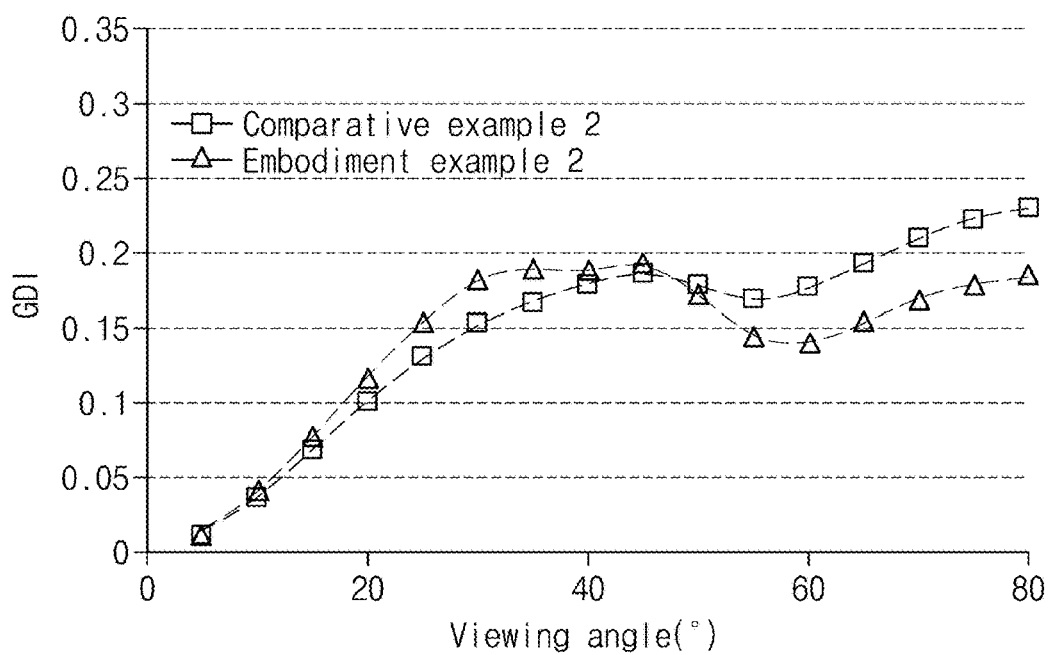

FIGS. 16A and 16B are graphs showing a distribution of GDI values according to the viewing angle.

FIG. 16A shows the GDI values depending on a viewing angle of Comparative example 1 and Embodiment example 1 in the display device DD shown in FIG. 3. That is, FIG. 16A shows display quality evaluation results for the optical film in which the pattern layer having a relatively low refractive index is disposed adjacent to the liquid crystal display panel. In the case of Comparative example 1, the side surface of the first protruding portion has the inclination angle of about 80 degrees with respect to the bottom surface in the trapezoid shape corresponding to the cross-section of the first protruding portion of the optical film. Embodiment example 1 corresponds to the display device including the optical film shown in FIG. 6. In FIG. 16A, the GDI values are compared with each other depending on the viewing angle under the same conditions except that the optical films have different shapes from each other in Comparative example 1 and Embodiment example 1.

Referring to FIG. 16A, Embodiment example 1 exhibits a lower GDI value at the side viewing angle equal to or greater than about 60 degrees as compared with Comparative example 1, and from this, it may be seen that the display quality of the Embodiment example is improved in the side viewing angle direction as compared with that in the Comparative example.

FIG. 16B shows the GDI values depending on a viewing angle of Comparative example 2 and Embodiment example 2 in the display device DD-1 shown in FIG. 11. That is, FIG. 16B shows display quality evaluation results for the optical film in which the pattern layer having the relatively higher refractive index is disposed adjacent to the liquid crystal display panel. In the case of Comparative example 2, the side surface of the second protruding portion has the inclination angle of about 80 degrees with respect to the bottom surface in the trapezoid shape corresponding to the cross-section of the second protruding portion of the optical film. Embodiment example 2 corresponds to the display device including the optical film shown in FIG. 12A. In FIG. 16B, the GDI values are compared with each other depending on the viewing angle under the same conditions except that the optical films have different shapes from each other in Comparative example 2 and Embodiment example 2.

Referring to FIG. 16B, Embodiment example 2 exhibits a lower GDI value at the side viewing angle equal to or greater than about 50 degrees as compared with Comparative example 2, and from this, it may be seen that the display quality of the Embodiment example is improved in the side viewing angle direction as compared with that in the Comparative example.

Figure 17:
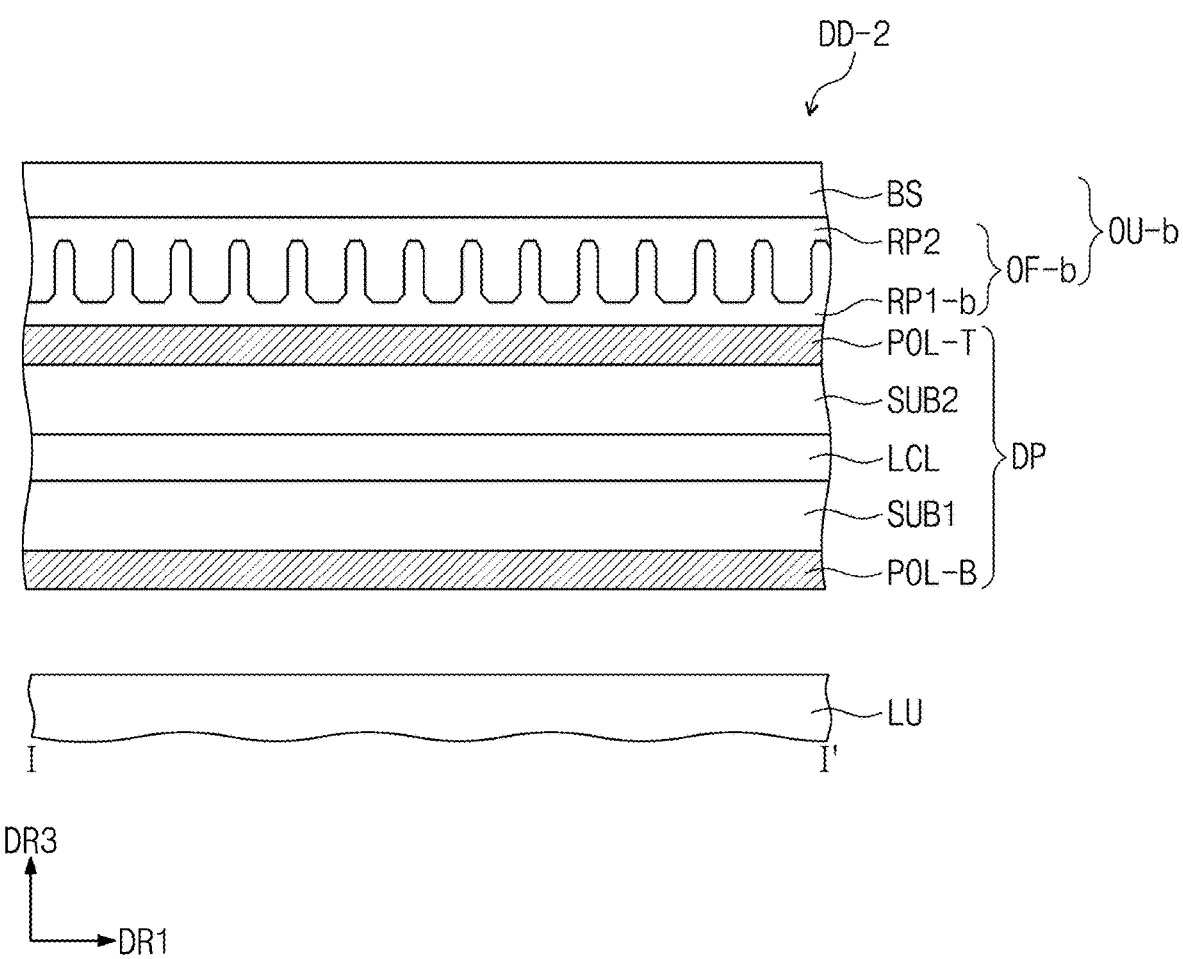
FIG. 17 is a cross-sectional view showing an exemplary embodiment of a display device according to the invention.

FIG. 17 is a cross-sectional view showing an exemplary embodiment of a display device DD-2 according to the invention. Hereinafter, the same descriptions of the display device DD-2 shown in FIG. 17 as those described with reference to FIGS. 1 to 12B will be omitted, and thus different features will be mainly described. The display device DD-2 in the exemplary embodiment includes a liquid crystal display panel DP and an optical film OF-b disposed on the liquid crystal display panel DP. The display device DD-2 in the exemplary embodiment may include a light source member LU disposed under the liquid crystal display panel DP and an optical member OU-b disposed on the liquid crystal display panel DP and including the optical film OF-b.

The optical film OF-b included in the display device DD-2 in the exemplary embodiment includes a first pattern layer RP1-b and a second pattern layer RP2. The first pattern layer RP1-b may have a refractive index lower than a refractive index of the second pattern layer RP2.

In the exemplary embodiment of the optical film OF-b included in the display device DD-2, an arrangement of the first pattern layer RP1-b and the second pattern layer RP2 may be substantially the same as the arrangement in the optical film OF described with reference to FIG. 6.

However, the first pattern layer RP1-b of the optical film OF-b may serve as an adhesive layer. The first pattern layer RP1-b may serve as a coupling member to attach an upper polarizing layer POL-T of the liquid crystal display panel DP to the optical member OU-b adjacent to each other. In an exemplary embodiment, the first pattern layer RP1-b may be, but not limited to, an optical clear adhesive layer, for example.

That is, the optical film OF-b may be directly disposed on the liquid crystal display panel DP in the display device DD-2 in the exemplary embodiment. The adhesive layer AD may be omitted between the liquid crystal display panel DP and the optical member OU-b as compared with the display device DD shown in FIG. 3.

The display device in the exemplary embodiment includes the optical film that is disposed on the liquid crystal display panel and includes two pattern layers having different refractive indices from each other, and thus the display device may provide improved viewing angle characteristics, front brightness characteristics, and contrast ratio. The optical film in the exemplary embodiment includes the protruding portions that include both of the sub-protruding portion having the side surface substantially perpendicular to the bottom surface and the sub-protruding portions having the inclination angle with respect to the bottom surface, and thus, the display device may have the improved display quality.

In addition, the optical film in the exemplary embodiment includes the sub-protruding portion having the side surface substantially perpendicular to the bottom surface and includes the pattern layer that satisfies the width of the protruding portions, the spacing interval between the protruding portions adjacent to each other, the relationship in height of the protruding portions, and the relationship in size of the side surface protruding portion and the chamfered portion, and thus the display device may have the improved display quality.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. An optical film comprising:
 a first pattern layer comprising a first base portion and a plurality of first protruding portions disposed on the first base portion, spaced apart from each other and having a first refractive index; and
 a second pattern layer disposed on the first pattern layer and having a second refractive index different from the first refractive index, each of the plurality of first protruding portions comprising:
  a first sub-protruding portion having a first width in a cross-section perpendicular to the first base portion, the first sub-protruding portion has a rectangular shape in the cross-section perpendicular to the first base portion;
  a second sub-protruding portion disposed between the first base portion and the first sub-protruding portion and having a width which increases from the first sub-protruding portion to the first base portion; and
  a third sub-protruding portion disposed on the first sub-protruding portion and having a width which decreases as a distance from the first sub-protruding portion increases.

2. The optical film of claim 1, wherein an absolute value of a difference between the first refractive index and the second refractive index is in a range from about 0.2 to about 0.25.

3. The optical film of claim 1, wherein the first sub-protruding portion comprises a first sub-bottom surface adjacent to the second sub-protruding portion, a first sub-upper surface facing the first sub-bottom surface, and a first sub-side surface connecting the first sub-bottom surface and the first sub-upper surface, and the first sub-side surface has an inclination angle from about 86 degrees to about 90 degrees with respect to the first sub-bottom surface.

4. The optical film of claim 1, wherein the first refractive index is smaller than the second refractive index, and a spacing interval $W_{P1}$ between first protruding portions of the plurality of protruding portions adjacent to each other and the first width $W_1$ of the first sub-protruding portion in the cross-section perpendicular to the first base portion have a relationship represented by the following Equation 1, $$0.15 \leq W_1/W_{P1} \leq 0.45, \quad \text{Equation 1}$$

where $W_{PI}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

5. The optical film of claim 1, wherein the first refractive index is smaller than the second refractive index, and a spacing interval $W_{PI}$ between first protruding portions adjacent to each other among the plurality of first protruding portions and a height $H_1$ of each of the first protruding portions in the cross-section perpendicular to the first base portion have a relationship represented by the following Equation 2, $$0.75 \leq H_1/W_{P1} \leq 1.35, \quad \text{Equation 2}$$

where $W_{PI}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

6. The optical film of claim 1, wherein each of the second sub-protruding portion and the third sub-protruding portion has a trapezoid shape in the cross-section perpendicular to the first base portion.

7. The optical film of claim 6, wherein a width of an upper surface of the second sub-protruding portion is equal to the first width of the first sub-protruding portion, and a width of a lower surface of the third sub-protruding portion is equal to the first width of the first sub-protruding portion.

8. The optical film of claim 6, wherein the second sub-protruding portion comprises a second sub-bottom surface adjacent to the first base portion, a second sub-upper surface facing the second sub-bottom surface, and a second sub-side surface connecting the second sub-bottom surface and the second sub-upper surface, and the second sub-side surface has an inclination angle from about 69 degrees to about 83 degrees with respect to the second sub-bottom surface.

9. The optical film of claim 8, wherein a maximum width $W_{B2}$ of the second sub-bottom surface and a maximum width $W_{C2}$ of the second sub-upper surface in a cross-section of the second sub-protruding portion perpendicular to the first base portion satisfy the following Equation 3

$$0.67 \leq W_{C2}/W_{B2} \leq 0.91. \quad \text{Equation 3}$$

10. The optical film of claim 8, wherein a maximum height $H_1$ in a thickness direction of the first protruding portion and a maximum height $H_{S2}$ in a thickness direction of the second sub-protruding portion in the cross-section of the first protruding portion perpendicular to the first base portion satisfy the following Equation 4

$$0.06 \leq H_{S2}/H_1 \leq 0.17. \quad \text{Equation 4}$$

11. The optical film of claim 6, wherein the third sub-protruding portion comprises a third sub-bottom surface adjacent to the first sub-protruding portion, a third sub-upper surface facing the third sub-bottom surface, and a third sub-side surface connecting the third sub-bottom surface and the third sub-upper surface, and the third sub-side surface has an inclination angle from about 69 degrees to about 83 degrees with respect to the third sub-bottom surface.

12. The optical film of claim 11, wherein a maximum width $W_{B3}$ of the third sub-bottom surface and a maximum width $W_{C3}$ of the third sub-upper surface in a cross-section of the third sub-protruding portion perpendicular to the first base portion satisfy the following Equation 5

$$0.67 \leq W_{C3}/W_{B3} \leq 0.90. \quad \text{Equation 5}$$

13. The optical film of claim 11, wherein a maximum height $H_1$ in a thickness direction of the first protruding portion and a maximum height $H_{S3}$ in a thickness direction of the third sub-protruding portion in the cross-section of each of the of the plurality of first protruding portions perpendicular to the first base portion satisfy the following Equation 6

$$0.06 \leq H_{S3}/H_1 \leq 0.17. \quad \text{Equation 6}$$

14. The optical film of claim 1, wherein the second pattern layer comprises:
a second base portion facing the first base portion; and
a plurality of second protruding portions disposed under the second base portion.

15. The optical film of claim 14, wherein each of the plurality of first protruding portions and the plurality of second protruding portions has a stripe shape extending in one direction.

16. The optical film of claim 15, wherein the first pattern layer further comprises first concave portions defined between the plurality of first protruding portions, the second pattern layer further comprises second concave portions defined between the plurality of second protruding portions, the plurality of first protruding portions respectively corresponds to the second concave portions, and the plurality of second protruding portions respectively corresponds to the first concave portions.

17. A display device comprising:
a liquid crystal display panel; and
an optical film disposed on the liquid crystal display panel, the optical film comprising:
a first pattern layer comprising a first base portion and a plurality of first protruding portions disposed on the first base portion, spaced apart from each other and having a first refractive index; and
a second pattern layer disposed on the first pattern layer and having a second refractive index different from the first refractive index, each of the plurality of first protruding portions comprising:
a first sub-protruding portion having a first width in a cross-section perpendicular to the first base portion, the first sub-protruding portion has a rectangular shape in the cross-section perpendicular to the first base portion;

a second sub-protruding portion disposed between the first base portion and the first sub-protruding portion and having a width which increases from the first sub-protruding portion to the first base portion; and a third sub-protruding portion disposed on the first sub-protruding portion and having a width which decreases as a distance from the first sub-protruding portion increases.

18. The display device of claim 17, wherein an absolute value of a difference between the first refractive index and the second refractive index is in a range from about 0.2 to about 0.25.

19. The display device of claim 17, wherein the first refractive index is smaller than the second refractive index, and a spacing interval $W_{P1}$ between first protruding portions adjacent to each other among the plurality of first protruding portions and the first width $W_1$ of the first sub-protruding portion in the cross-section perpendicular to the first base portion have a relationship represented by the following Equation 1, $$0.15 \leq W_1/W_{P1} \leq 0.45, \quad \text{Equation 1}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

20. The display device of claim 17, wherein the first refractive index is smaller than the second refractive index, and a spacing interval $W_{P1}$ between first protruding portions adjacent to each other among the plurality of first protruding portions in the cross-section perpendicular to the first base portion and a height $H_1$ of each of the first protruding portions have a relationship represented by the following Equation 2, $$0.75 \leq H_1/W_{P1} \leq 1.35, \quad \text{Equation 2}$$

where $W_{P1}$ is obtained by adding the first width $W_1$ of the first sub-protruding portion and a minimum spacing interval $W_2$ between the first sub-protruding portions of the adjacent first protruding portions, and $W_1$ and $W_2$ correspond to distances in a direction perpendicular to an extension direction of the first protruding portions.

21. The display device of claim 17, wherein the second pattern layer comprises:

a second base portion facing the first base portion; and a plurality of second protruding portions disposed under the second base portion, and each of the plurality of second protruding portions comprises:

a fourth sub-protruding portion having a second width in a cross-section perpendicular to the second base portion;

a fifth sub-protruding portion disposed between the second base portion and the fourth sub-protruding portion and having a width which increases from the fourth sub-protruding portion to the second base portion; and a sixth sub-protruding portion disposed between the first base portion and the fourth sub-protruding portion and having a width which decreases from the fourth sub-protruding portion to the first base portion.

22. The display device of claim 21, wherein the first refractive index is greater than the second refractive index, and a spacing interval $W_{P2}$ between second protruding portions adjacent to each other among the plurality of second protruding portions in a cross-section perpendicular to the second base portion and the second width $W_{2-1}$ of the fourth sub-protruding portion have a relationship represented by the following Equation 1-1, $$0.15 \leq W_{2-1}/W_{P2} \leq 0.45, \quad \text{Equation 1-1}$$

where $W_{P2}$ is obtained by adding the second width $W_{2-1}$ of the fourth sub-protruding portion and a minimum spacing interval $W_{1-1}$ between the fourth sub-protruding portions of the adjacent second protruding portions, and $W_{1-1}$ and $W_{2-1}$ correspond to distances in a direction perpendicular to an extension direction of the second protruding portions.

23. The display device of claim 21, wherein the first refractive index is greater than the second refractive index, and a spacing interval $W_{P2}$ between second protruding portions adjacent to each other among the plurality of second protruding portions in the cross-section perpendicular to the second base portion and a height $H_{2-1}$ of each of the second protruding portions have a relationship represented by the following Equation 2-1, $$0.75 \leq H_{2-1}/W_{P2} \leq 1.35, \quad \text{Equation 2-1}$$

where $W_{P2}$ is obtained by adding the second width $W_{2-1}$ of the fourth sub-protruding portion and a minimum spacing interval $W_{1-1}$ between the second sub-protruding portions of the adjacent second protruding portions, and $W_{1-1}$ and $W_{2-1}$ correspond to distances in a direction perpendicular to an extension direction of the second protruding portions.

24. The display device of claim 17, wherein each of the second sub-protruding portion and the third sub-protruding portion has a trapezoid shape in the cross-section perpendicular to the first base portion.

* * * * *